Dec. 25, 1962  J. A. RICHARDSON  3,070,276
CARTONS
Filed May 12, 1960  20 Sheets-Sheet 1

INVENTOR
JAMES ARTHUR RICHARDSON
By Cushman, Darby & Cushman
ATTORNEYS

Dec. 25, 1962  J. A. RICHARDSON  3,070,276
CARTONS
Filed May 12, 1960  20 Sheets-Sheet 4

INVENTOR
JAMES ARTHUR RICHARDSON

By Cushman, Darby & Cushman

ATTORNEYS

Dec. 25, 1962   J. A. RICHARDSON   3,070,276
CARTONS
Filed May 12, 1960   20 Sheets-Sheet 6

INVENTOR
JAMES ARTHUR RICHARDSON
By Cushman, Darby & Cushman
ATTORNEYS

Dec. 25, 1962  J. A. RICHARDSON  3,070,276
CARTONS
Filed May 12, 1960  20 Sheets-Sheet 7

INVENTOR
JAMES ARTHUR RICHARDSON
By Cushman, Darby & Cushman
ATTORNEYS

INVENTOR
JAMES ARTHUR RICHARDSON
By Cushman, Darby & Cushman
ATTORNEYS

Fig. 12  INVENTOR
JAMES ARTHUR RICHARDSON
By Cushman, Darby & Cushman
ATTORNEYS

Dec. 25, 1962 J. A. RICHARDSON 3,070,276
CARTONS
Filed May 12, 1960 20 Sheets-Sheet 11

INVENTOR
JAMES ARTHUR RICHARDSON
By Cushman, Darby & Cushman
ATTORNEYS

Dec. 25, 1962  J. A. RICHARDSON  3,070,276
CARTONS
Filed May 12, 1960  20 Sheets-Sheet 12

INVENTOR
JAMES ARTHUR RICHARDSON
By Cushman, Darby & Cushman
ATTORNEYS

Dec. 25, 1962 J. A. RICHARDSON 3,070,276
CARTONS
Filed May 12, 1960 20 Sheets-Sheet 14

INVENTOR
JAMES ARTHUR RICHARDSON
By Cushman, Darby & Cushman
ATTORNEYS

Dec. 25, 1962 J. A. RICHARDSON 3,070,276
CARTONS
Filed May 12, 1960 20 Sheets-Sheet 16

INVENTOR
JAMES ARTHUR RICHARDSON
By Cushman, Darby & Cushman
ATTORNEYS

INVENTOR
JAMES ARTHUR RICHARDSON
By Cushman, Darby & Cushman
ATTORNEYS

INVENTOR
JAMES ARTHUR RICHARDSON
By Cushman, Darby & Cushman
ATTORNEYS

United States Patent Office 3,070,276
Patented Dec. 25, 1962

3,070,276
CARTONS
James A. Richardson, Burnaby, British Columbia, Canada, assignor, by mesne assignments, to Unipak Cartons Ltd., Vancouver, British Columbia, Canada
Filed May 12, 1960, Ser. No. 28,698
Claims priority, application Canada Mar. 11, 1960
42 Claims. (Cl. 229—15)

This invention relates to cartons and more particularly to an improved interior assembly serving to define article receiving compartments in said carton.

In the transportation of fragile articles, such as glass bottles in cartons having mutually transverse partitions, many proposals have been made to ensure that the partitions between such bottles give the maximum amount of protection. Among these proposals have been internal separator assembles positioned within the wall structure of the carton so as to form the mutually transverse partitions.

Some of these internal separator assemblies have been constructed from a single blank of cardboard so cut, incised and folded that, when in operative position, portions of the blank have formed one or more longitudinal partitions, whereas other portions of the blank have formed transverse partitions integrally connected, at one end, to a longitudinal partition and, at the other end, to opposing side walls of the carton by adhesive. However, such internal separator assemblies have, heretofore, been concerned with preventing contact between fragile articles, such as glass bottles, in two adjacent longitudinally extending rows of compartments and have, as will be appreciated, been consequently limited in their application when considering more than two adjacent longitudinally extending rows of compartments.

Thus, one object of the present invention is to provide an improved interior assembly constructed from a one-piece blank so cut and scored that the latter, when folded, will form a plurality of mutually transverse partitions within the carton and define more than two adjacent longitudinal rows of articles receiving compartments therein.

The invention is illustrated in the accompanying drawings in which.

Figure 1:
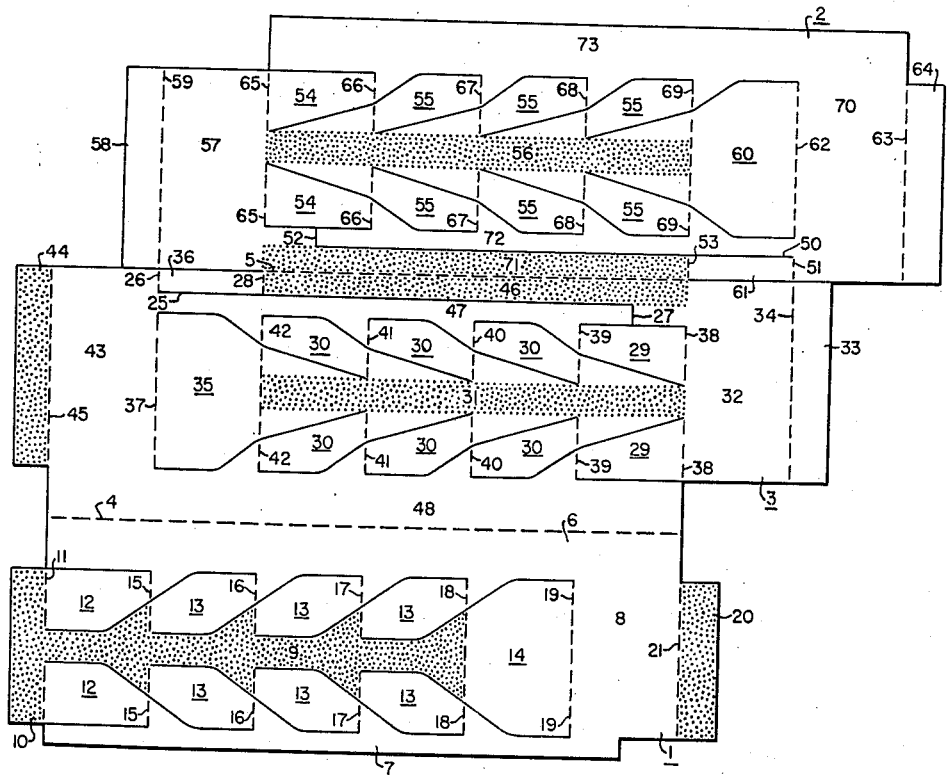
FIGURE 1 is a plan view of a one-piece blank, before folding thereof has occurred, from which an interior assembly defining three adjacent longitudinal rows of article receiving compartments is formed.
Figure 2:
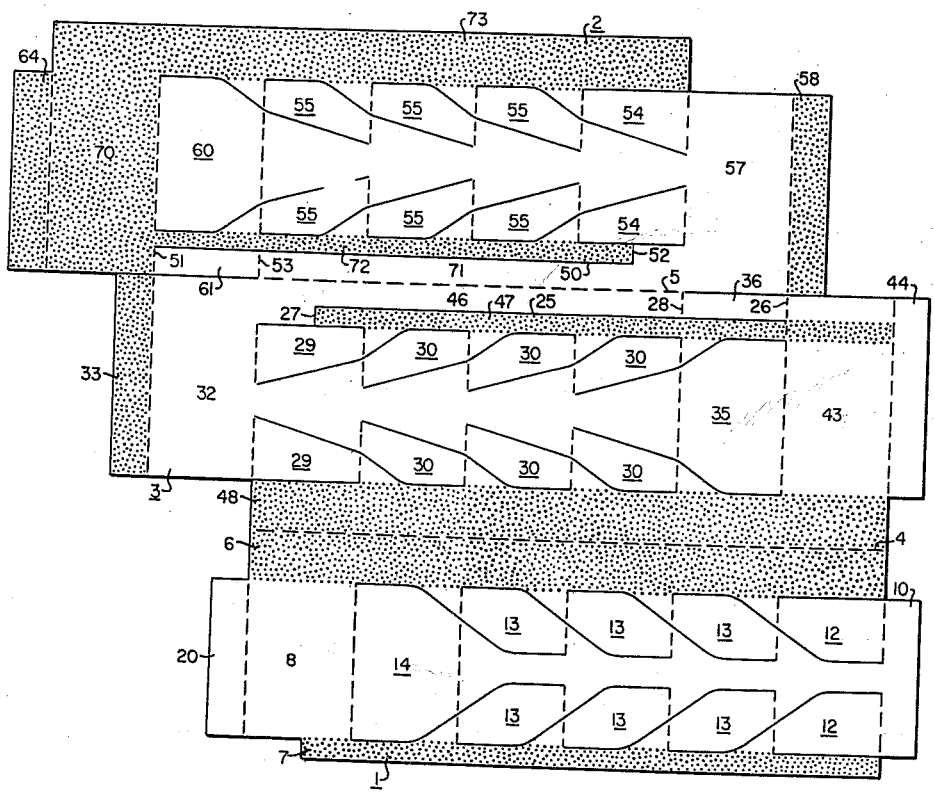
FIGURE 2 is a plan view of the obverse side of the one-piece blank shown in FIGURE 1.

Referring to the drawings, a one-piece blank suitable for forming a unitary member constituting an interior assembly defining adjacent longitudinal rows of article receiving compartments is shown in FIGURES 1 and 2.

As will be seen from FIGURES 1 and 2, the one-piece blank shown therein is cut and scored to provide a pair of outer main panels indicated generally at 1, 2 spaced apart by one intermediate panel indicated generally at 3. The outer main panel 1 is connected to the intermediate main panel 3 by a common score line 4, whereas the latter main panel is connected to the remaining outer main panel 2 by means of a common score line 5.

The main panel 1 is scored and incised so as to provide a first primary portion constituted by a portion 6 extending throughout the length of said one outer main panel 1 adjacent to the common score line 4, a portion 7 extending throughout the length of the main panel 1 and adjacent a marginal edge thereof, and an ancillary portion 8 located adjacent one side marginal edge of the main panel 1 and connecting the portions 6 and 7 together. The outer main panel 1 is also cut and scored to provide a second primary portion constituted by a panel 9 terminating, at one end thereof, in a hingeable tab 10 connected thereto by a score line 11. The outer main panel 1 is further cut and scored to provide a plurality of secondary portions 12, 13 arranged in two adjacent longitudinally extending series spaced apart by the panel 9 the end of which, remote from the hingeable tab 10, terminates in a secondary portion 14.

The pair of secondary portions 12 are each hingeably and integrally connected at one end to the panel 9 by means of the score line 11 and, at the other end, to the first primary portion of the main panel 1, by means of a score line 15. The ends of the pair of secondary portions 13 adjacent to the pair of secondary portions 12 are each hingeably and integrally connected in a similar manner by means of the score line 15 and another score line 16, and the ends of the following pairs of secondary portions 13 are connected to the panel 9 and the first primary portion of the main panel 1 by score lines 16–18. One end of the secondary portion 14 is connected to the panel 9 by means of score line 18 whereas its remaining end is connected to the ancillary portion 8 of the main panel 1 by means of a score line 19, said ancillary portion 8 having a hingeable end tab 20 connected thereto by means of a score line 21. Thus, the second primary portion of the outer main panel 1 terminates, at the end remote from the tab 10, in the secondary portion 14.

As will be seen from FIGURE 1, one face of the tabs 10 and 20 and one face of the panel 9 is coated with any suitable pressure sensitive adhesive whereas, as will be seen from FIGURE 2, the obverse face of portions 6 and 7 of the main panel 1 are similarly coated.

The intermediate main panel 3 is provided with a longitudinally extending incision 25 adjacent to the common score line 5, said incision 25 terminating, at one end thereof, in a score line 26 extending at right angles thereto, and, at the other end, in an incision 27 extending in the opposite direction to the score line 26. A second score line 28 parallel to the score line 26 is also provided between the incision 25 and the common score line 5 and the area of the main intermediate panel 3 bounded by said score lines 26, 28 and the incision 25 and common score line 5 defines a secondary portion 36.

The intermediate main panel 3 is also cut and scored to provide further secondary portions 29, 30 arranged in two adjacent longitudinally extending series each spaced apart by a panel 31 one end of which terminates in a further panel 32 provided with a hingeable end tab 33 connected thereto by a score line 34. The other end of the panel 31 terminates in a secondary portion 35 connected, at one end thereof, to the intermediate main panel 3 by means of a score line 37. One end of each of the pair of secondary portions 29 is hingeably and integrally connected to the further panel 32 by means of a score line 38 and the other end of each secondary portion 29 is hingeably and integrally connected to the intermediate main panel 3 by means of a score line 39. The ends of the pair of secondary portions 30 adjacent to the pair of secondary portions 29 are each hingeably and integrally connected in a similar manner by means of the score line 39 and another score line 40, and the ends of the following pairs of secondary portions 30 are connected to the panel 31 and the remainder of the intermediate main panel 3 by score lines 40–42, the remaining end of secondary portion 35 being hingeably and integrally connected to the panel 31 by means of the score line 42.

A portion 43 of the intermediate main panel 3, located between the score line 37 and a further score line 45 serves, as will be described hereinafter, as an ancillary panel and is provided with a hingeable end tab 44 connected thereto by means of the score line 45.

A portion 46 of the intermediate main panel 3, located between the incision 25 and the common score line 5, and the panel 31 and hingeable end tab 44 each have one face coated with pressure sensitive adhesive.

The obverse face (see FIGURE 2) of that portion 47 of the intermediate main panel 3 located between the incisions 25 and 27 and the secondary portions 29, 30 and 35 is similarly coated with pressure sensitive adhesive as is the obverse face of that portion 48 extending between the secondary portions 29, 30 and 35 and the common score line 4. As will be seen from FIGURE 2, the obverse face of the hingeable end tab 33 is also coated with pressure sensitive adhesive.

Thus, the portions 43, 47 and 48 constitute a first primary portion of the intermediate main panel, and the panels 31, 32 and portion 46 constitute a second primary portion of said intermediate main panel 3 terminating, at one end thereof, in the secondary portions 35, 36 and being hingeably and integrally connected to the first primary portion of said main intermediate panel by the secondary portions 29, 30, 35 and 36.

The remaining outer main panel 2 is provided with a longitudinally extending incision 50 adjacent to the common score line 5, said incision terminating, at one end thereof, in a score line 51 extending at right angles thereto and, at the other end, in an incision 52 extending in an opposite direction to the score line 51. A second score line 53 parallel to the score line 51 is also provided between the incision 50 and the common score line 5, and the area of the remaining outer main panel 2 bounded by said score lines 51, 53 and the incision 50 and the common score line 5, defines a secondary portion 61.

The remaining outer main panel 2 is also cut and scored to provide further secondary portions 54, 55 arranged in two adjacent longitudinally extending series each spaced apart by a panel 56 one end of which terminates in a further panel 57 provided with a hingeable end tab 58 connected thereto by a score line 59. The other end of the panel 56 terminates in a secondary portion 60 connected, at one end thereof, to the main panel 2 by means of a score line 62.

One end of each of the pair of secondary portions 54 is hingeably and integrally connected to the further panel 57 by means of a score line 65 and the other end of each secondary portion 54 is hingeably and integrally connected to the remaining outer main panel 2 by means of a score line 66. The ends of the pair of secondary portions 55 adjacent to the pair of secondary portions 54 are each hingeably and integrally connected in a similar manner by means of the score line 66 and another score line 67, and the ends of the following pairs of secondary portions 55 are connected to the panel 56 and the remainder of the remaining outer main panel 2 by score lines 67–69, the remaining end of the secondary portion 60 being hingeably and integrally connected to the panel 56 by means of the score line 69.

A portion 70 of the intermediate main panel 2, located between the score line 37 and a further score line 63 serves, as will be described hereinafter, as an ancillary panel and is provided with a hingeable end tab 64 connected thereto by score line 63.

A portion 71 of the intermediate main panel 2, located between the incision 50 and the common score line 5, and the panel 56 each have one face coated with pressure sensitive adhesive.

The obverse face (see FIGURE 2) of that portion 72 of the intermediate main panel 2 located between the incisions 50 and 52 and the secondary portions 54, 55 and 60 is similarly coated with pressure sensitive adhesive as is the obverse face of that portion 73 extending between the secondary portions 54, 55 and 60 and the outer longitudinal marginal edge of the main panel 2. As will be seen from FIGURE 2, the obverse face of each of the hingeable end tabs 58 and 64, as well as the obverse face of portion 70 is also coated with pressure sensitive adhesive.

Thus, the panels 56, 57 and portion 71 constitute a first primary portion of the remaining outer main panel 2 and the portions 70, 72 and 73 constitute a second primary portion thereof hingeably and integrally connected to said first primary portion by the secondary portions 54, 55, 60 and 61, one end of said secondary portion terminating in the pair of secondary portions 54.

Figure 3:
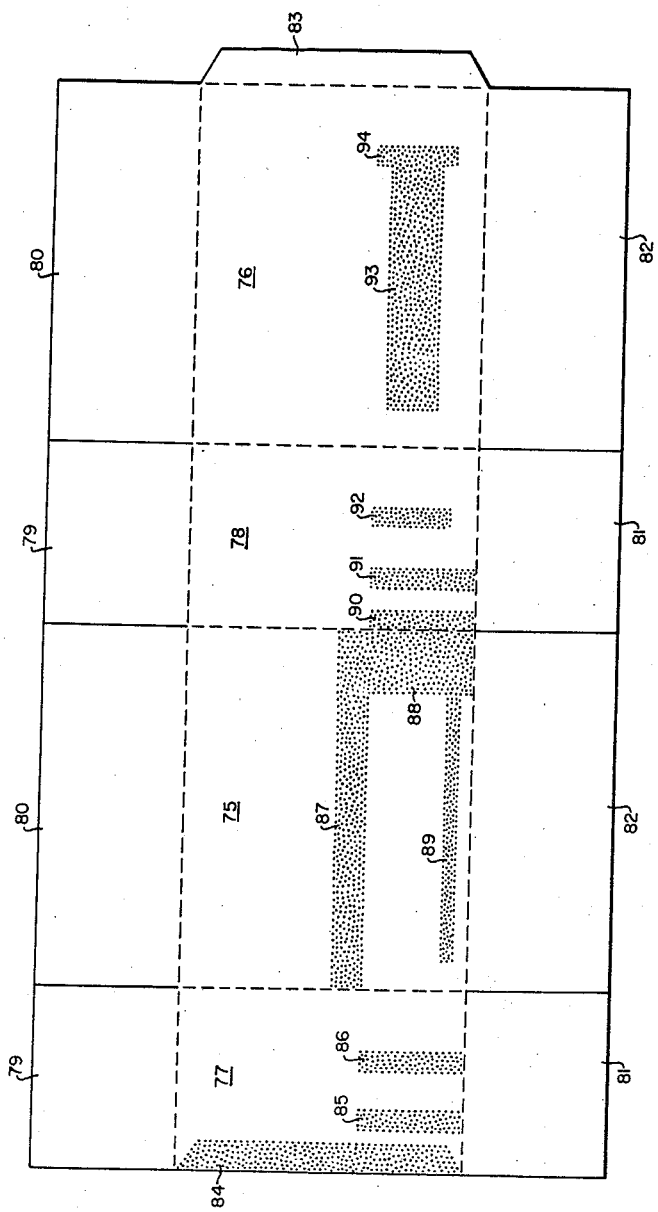
FIGURE 3 is a plan view of the blank from which the wall structure of the carton is formed.

The carton blank shown in FIGURE 3 is scored and incised to provide side walls 75, 76, end walls 77, 78, top end closures 79, top side closures 80, bottom end closures 81, and bottom side closures 82. The free end of side wall 76 is provided with an elongated tab 83 which is adapted to be united with the free side of the end wall 77 through the intermediary of a strip 84 of pressure sensitive adhesive extending throughout the length of said end wall 77 adjacent to its free marginal edge.

It will be observed that end wall 77 is also provided with a further two strips 85, 86 of pressure sensitive adhesive and the side wall 75 is provided with similar coated strips 87–89. The remaining end wall 78 is provided with three coated strips 90–92, and the remaining side wall 76 is provided with two similar strips 93, 94 in the form of a T-shaped area.

In forming the interior assembly from the blank shown in FIGURES 1 and 2, the main panels 1 and 3 are folded along the common score line 4 so that the coated areas 6, 7 of the main panel 1 will respectively adhere to the coated areas 48, 27 of the main panel 3. The main panel 2 is then folded along the common score line 5, so that the coated face of the panel 56 therof will adhere to the coated face of the panel 31 of the intermediate main panel 3, and the tab 64 of the outer main panel 2 is folded along score line 63 so that its coated side is uppermost.

Accordingly, in assembling the carton to its knockdown condition, the folded blank is placed on to the carton blank so that the coated areas of portions 70, 72, 73 of the main panel 2 will be in registry, respectively, with the coated areas 88, 89 and 87 of the side wall 75. In this position, the coated faces of tabs 58 and 44 of the respective main panels 2, 3, will be in registry with the coated strips 86, 85 of end wall 77. The remaining end wall 78 and side wall 76 are then folded over so that the coated strips 90, 91 and 92 of said end wall 78 will, respectively, be in registry with the coated faces of end tabs 64, 33 and 20 of the three main panels and so that the coated portions 93, 94 of the side wall 76 will be brought into registry with the coated surfaces of the panel 9 and tab 10 of the main panel 1. Before the folding over of the remaining end wall 78 and side wall 76 of the carton blank occurs, as described above, the tab 83 on the side wall 76 is bent inwardly so that when said folding does take place, the tab 83 will adhere to the coated strip 84.

Figure 4:
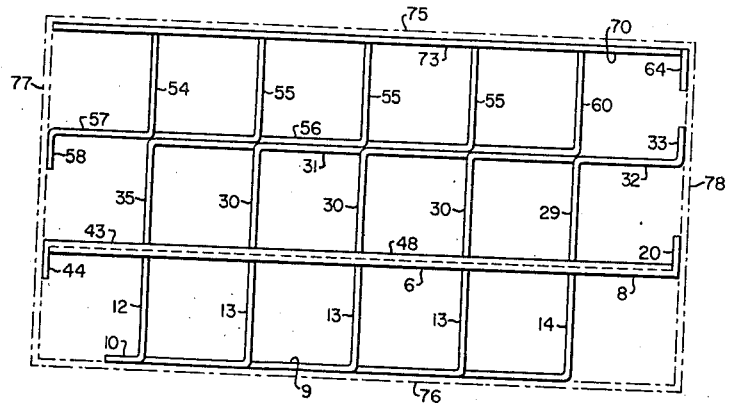
FIGURE 4 is a plan view of the erected interior assembly formed by the blank shown in FIGURES 1 and 2 and its relation to the carton.

Thus, when the components are positioned as described above and pressure is brought to bear thereon, suitable adhesion of the coated surfaces will be brought about. If the carton is then erected, the adhesion of the components will form an interior assembly such as that shown in FIGURES 4 to 6 where, it will be observed, the secondary portions of each of the main panels will serve as transverse partitions each of which, with the exception of that formed by the secondary portion 14, is constituted by two such upper and lower secondary portions disposed in a common plane.

Figure 7:
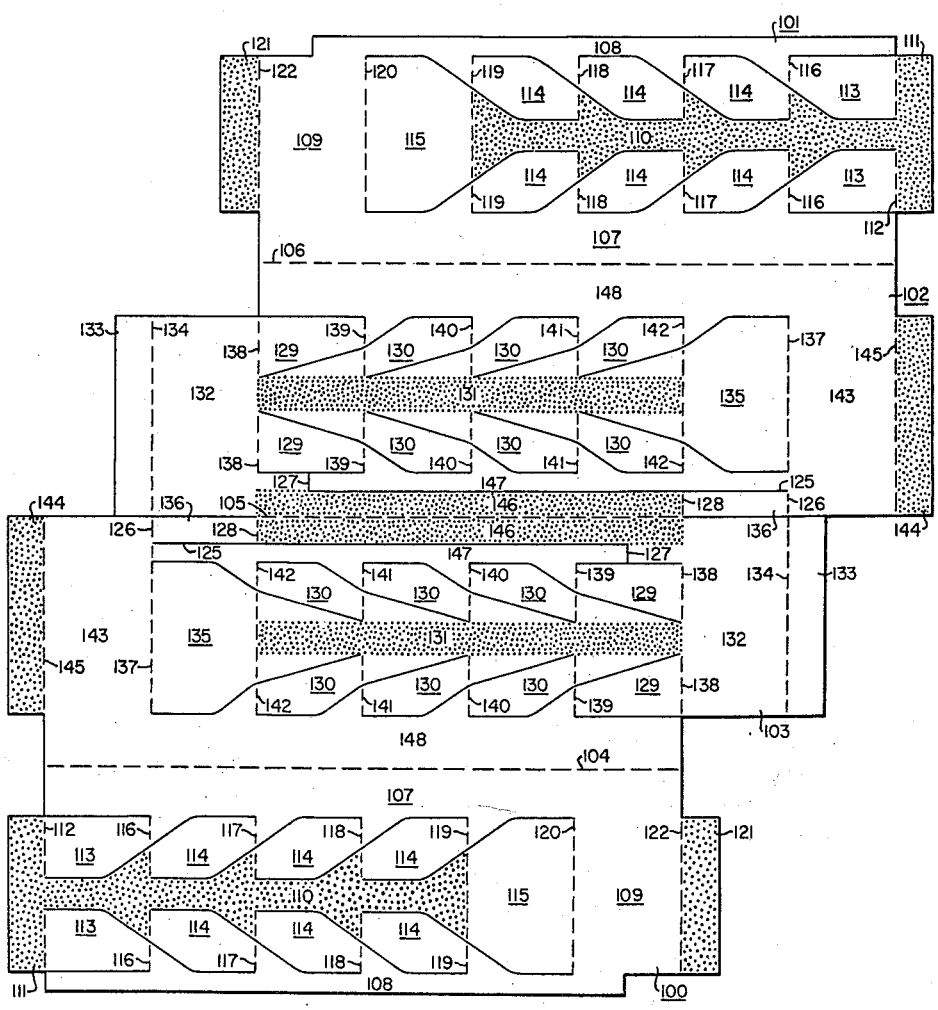
FIGURE 7 is a plan view of a one-piece blank, before folding thereof has occurred, from which an interior assembly defining four adjacent longitudinal rows of article receiving compartments is formed.
Figure 8:
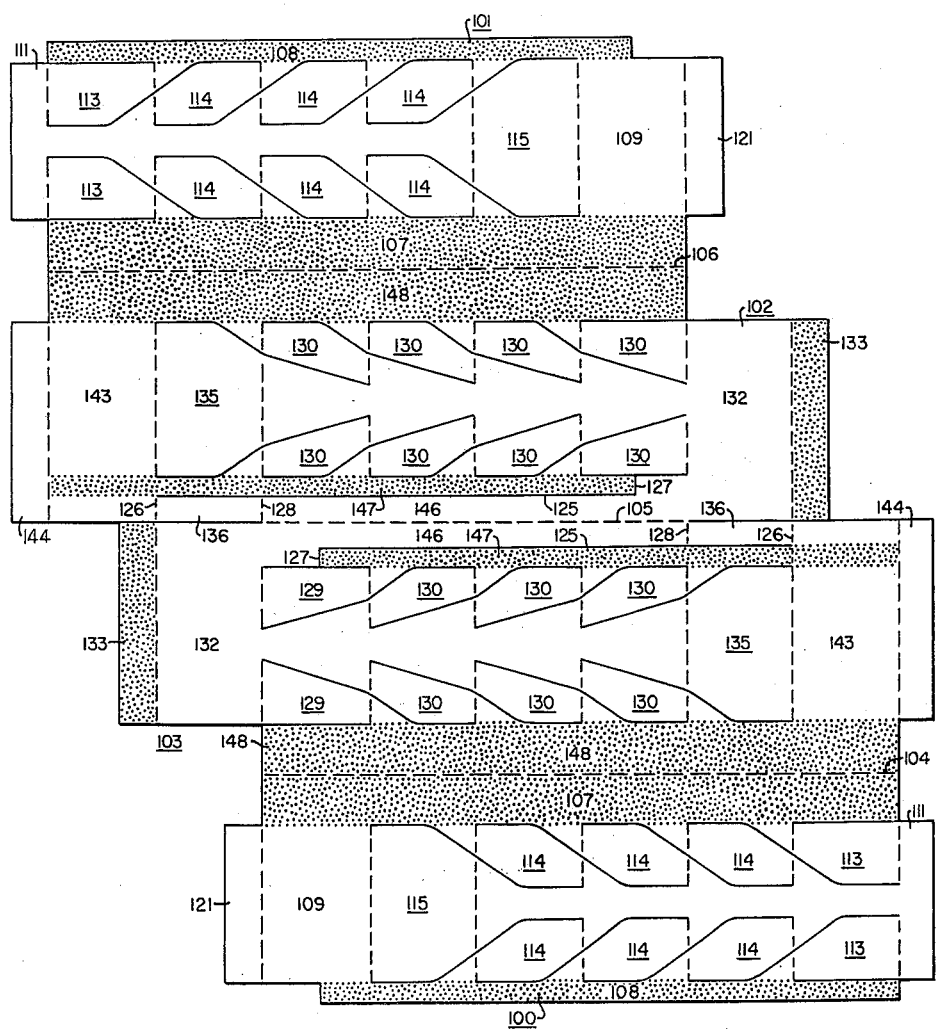
FIGURE 8 is a plan view of the obverse side of the one-piece blank shown in FIGURE 7.

Referring now to FIGURES 7–12 and more particularly to FIGURES 7 and 8, a modified form of a one-piece blank is shown suitable for forming a unitary member constituting an interior assembly defining adjacent longitudinal rows of article receiving compartments.

As will be seen from FIGURES 7 and 8, the one-piece blank shown therein is cut and scored to provide a pair of complementary outer main panels indicated generally at 100, 101, spaced apart by a complementary pair of intermediate panels indicated generaly at 102, 103. The outer main panel 100 is connected to the adjacent intermediate main panel 103 by a common score line 104, whereas the latter main panel is connected to the other intermediate main panel 102 by means of a common score line 105, whilst the last-mentioned panel is connected to the remaining outer main panel 101 by a common score line 106.

Each of the main panels 100, 101 is scored and incised so as to provide a first primary portion constituted by a portion 107 extending throughout the length of each outer main panel adjacent to their associated common score lines, a portion 108 extending throughout the length of the outer main panel 100 and adjacent a marginal edge of each outer main panel, and an ancillary portion 109 located adjacent one side marginal edge of each outer main panel 100 and connecting the portions 107 and 108 together. Each outer main panel 100, 101 is also cut and scored to provide a second primary portion constituted by a panel 110 terminating, at one end thereof, in a hingeable tab 111 connected thereto by a score line 112. Each of the outer main panels 100, 101 is further cut and scored to provide a plurality of secondary portions 113, 114 arranged in two adjacent longitudinally extending series each spaced apart by the panel 110 the end of which, remote from the hingeable tab 111, terminates in a secondary portion 115.

The pair of secondary portions 113 of each outer main panel 100, 101 are each hingeably and integrally connected, at one end, to the panel 110 by means of the score line 112, and, at the other end, to the first primary portion of the main panel 100, by means of a score line 116. The ends of the pair of secondary portions 114 adjacent to the pair of secondary portions 113 are each hingeably and integrally connected in a similar manner by means of the score line 116 and another score line 117, and the ends of the following pairs of secondary portions 114 are connected to the panel 110 and the first primary portion of each outer main panel 100, 101 by scores lines 117–119. One end of the secondary portion 115 of each outer main panel 100, 101 is connected to the panel 110 thereof by means of score line 119 whereas its remaining end is connected to the ancillary portion 109 of the main panel 100 by means of a score line 120, said ancillary portion 109 having a hingeable end tab 121 connected thereto by means of a score line 122. Thus, the second primary portion of each outer main panel 100—101 terminates, at the end remote from the tab 111, in the secondary portion 115.

As will be seen from FIGURE 7 one face of the tabs 111 and 121 of each outer main panel and one face of the panel 110 thereof is coated with any suitable pressure sensitive adhesive whereas, as will be seen from FIGURE 8, the obverse face of portions 107 and 108 of each of the main panels 100, 101 are similarly coated.

The pair of complementary intermediate main panels 102, 103 are each provided with a longitudinally extending incision 125 adjacent to the common score line 105, said incision 125 terminating, at one end thereof, in a score line 126 extending at right angles thereto and, at the other end, in an incision 127 extending in the opposite direction to the score line 126. A second score line 128 parallel to the score line 126 of each intermediate main panel is also provided between the incision 125 and the common score line 105 and the area of each intermediate main panel 102, 103 bounded by said score line 126, 128 and the incision 125 and common score line 105 defines a secondary portion 136.

Each of the intermediate main panels 102, 103 is also cut and scored to provide further secondary portions 120, 130 arranged in two adjacent longitudinally extending series each spaced apart by a panel 131 one end of which terminates in a further panel 132 provided with a hingeable end tab 133 connected thereto by a score line 134.

The other end of the panel 131 terminates in a secondary portion 135 connected, at one end thereof, to each of the intermediate main panels 102, 103 by means of a score line 137.

One end of each of the pair of secondary portions 129 of each intermediate main panel is hingeably and integrally connected to the further panel 132 by means of a score line 138 and the other end of each secondary portions 129 is hingeably and integrally connected to its respective intermediate main panel by means of a score line 139. The ends of the pair of secondary portions 130 adjacent to the pair of secondary portions 129 are each hingeably and integrally connected in a similar manner by means of the score line 139 and another score line 140, and the ends of the following pairs of secondary portions 130 are connected to the panel 131 and the remainder of each of the intermediate main panels 102, 103 by score lines 140–142, the remaining end of secondary portion 135 being hingeably and integrally connected to the panel 131 by means of the score line 142.

A portion 143 of each intermediate main panel 102, 103 located between the score line 137 and a further score line 145 serves, as will be described hereinafter, as an ancillary panel and is provided with a hingeable end tab 144 connected thereto by means of the score line 145.

A portion 146 of each of the intermediate main panels 102, 103 located between the incision 125 and the common score line 105, and the panel 131 and hingeable end tab 144 each have one face coated with pressure sensitive adhesive.

The obverse face (see FIGURE 8) of that portion 147 of each intermediate main panel 102, 103 located between the incisions 125 and 127 and the secondary portions 129, 130 and 135 is similarly coated with pressure sensitive adhesive as is the obverse face of that portion 148 extending between the secondary portions 129, 130 and 135 and the respective common score lines 106, 104. As will be seen from FIGURE 8, the obverse face of the hingeable end tab 133 of each intermediate main panel 102, 103 is also coated with pressure sensitive adhesive.

Thus, the portions 143, 147 and 148 of each intermediate main panel 102, 103 constitutes a first primary portion of their respective intermediate main panels, and the panels 131, 132 and portion 146 of each of said intermediate main panels constitute a second primary portion of each of said intermediate main panels terminating, at one end thereof, in the secondary portions 135, 136 and being hingeably and integrally connected to the first primary portion of its respective main intermediate panel 103 by the secondary portions 129, 130, 135 and 136 thereof.

Figure 9:
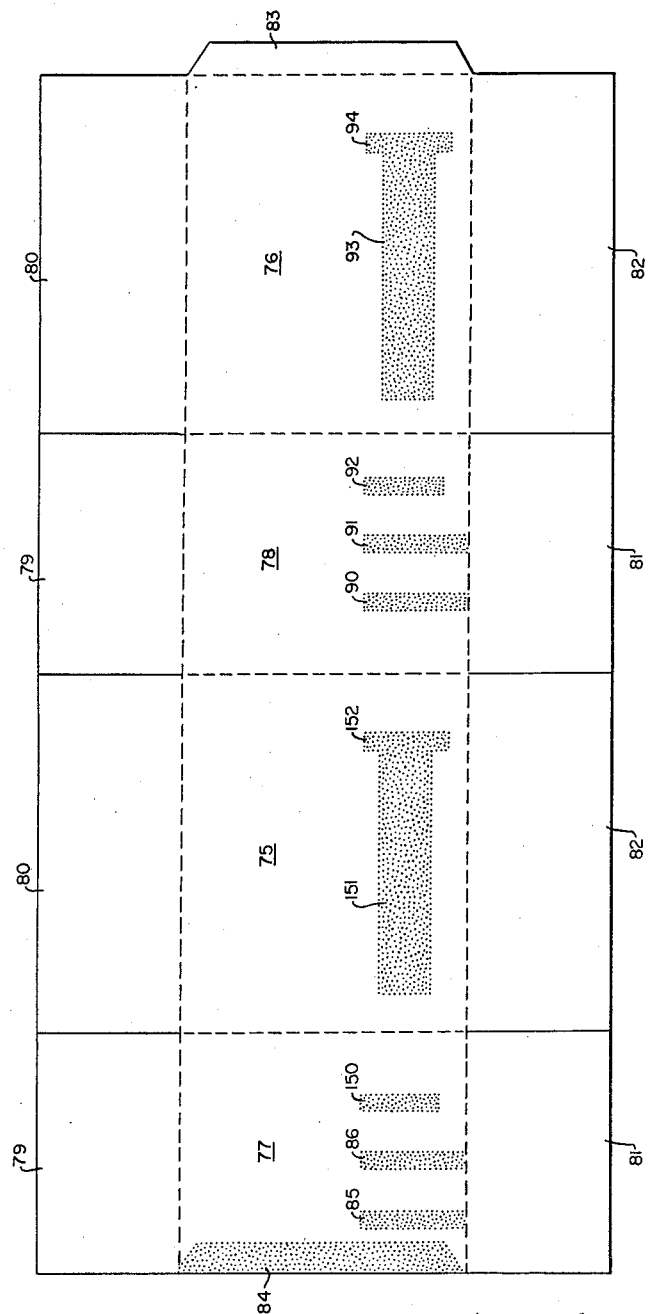
FIGURE 9 is a plan view of the blank from which the wall structure of the carton, associated with the blank shown in FIGURES 7 and 8, is formed.
Figure 10:
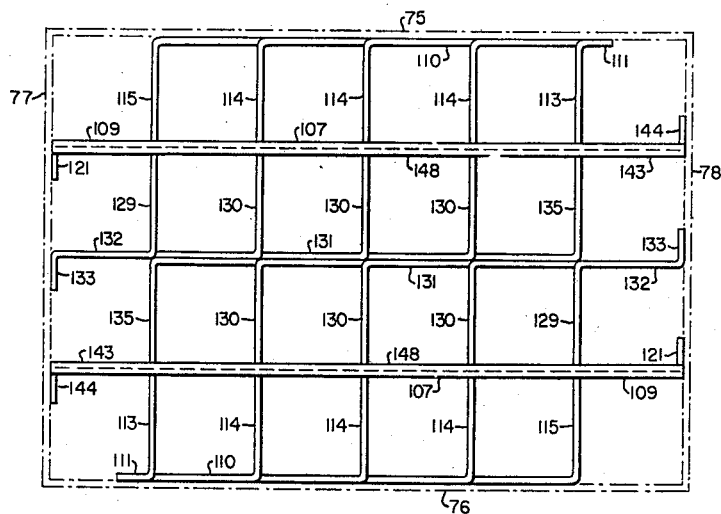
FIGURE 10 is a plan view of the interior assembly formed by the blank shown in FIGURES 7 and 8.

The carton blank shown in FIGURE 9 is scored and incised in a similar manner to that shown in FIGURE 3 and thus the corresponding integers thereof bear the same reference numerals for convenience. However, it will be noted that the end walls 77, 78, top end closures 79 and bottom end closures 81 are each of a greater width than those of the carton blank shown in FIGURE 3.

In connection with the end wall 77 of the carton blank shown in FIGURE 9, an additional strip 150 of pressure sensitive adhesive is provided, and the strips 90–92 of adhesive on the other end wall 78 are spaced in a slightly different manner to the similar strips shown in FIGURE 3. The side wall 77 of the carton blank shown in FIGURE 9 is also provided with different coated adhesive areas than that shown in FIGURE 3. In FIGURE 9, the side wall 77 is provided with two strips 151, 152 of pressure sensitive adhesive in the form of a T-shaped area similar to the strips 93, 94 of the remaining side wall 76.

In forming the interior assembly from the blank shown in FIGURES 7 and 8, the main panels 100 and 103 are folded along the common score line 104 so that the coated areas 107, 108 of the main panel 100 will respectively adhere to the coated areas 148, 147 of the main panel 103. The main panels 101, 102 are then folded along the common score line 106, in a similar manner so that the coated areas 108, 107 of the main panel 101 will respectively adhere to the coated areas 147, 148 of the main panel 102. The blank is then folded along the common score line 105.

Accordingly, in assembling the carton to its knockdown condition, the folded blank is placed on to the carton blank so that the coated panel 110 and tab 111 of the main panel 101 will be in registry, respectively, with the coated areas 151 and 152 of the side wall 75. In this position, the coated faces of tabs 121, 132 and 144 of the respective main panels 101, 102 and 103 will be in registry with the coated strips 150, 86 and 85 of end wall 77. The remaining end wall 78 and side wall 76 are then folded over so that the coated strips 90, 91 and 92 of said end wall 78 will, respectively, be in registry with the coated faces of end tabs 144, 133 and 121 of the main panels 102, 103 and 100 and so that the coated portions 93, 94 of the side wall 76 will be brought into registry with the coated surfaces of the panel 110 and tab 111 of the main panel 110. Before the folding over of the remaining end wall 78 and side wall 76 of the carton blank occurs, as described above, the tab 83 on the side wall 76 is bent inwardly so that when said folding does take place, the tab 83 will adhere to the coated strip 84.

Thus, when the components are positioned as described above and pressure is brought to bear thereon, suitable adhesion of the coated surface will be brought about. If the carton is then erected, the adhesion of the components will form an interior assembly such as that shown in FIGURES 10 to 12 where, it will be observed, the secondary portions of each main panel will serve as transverse partitions each of which, with the exception of those formed by secondary portions 115, is constituted by two such upper and lower secondary portions disposed in a common plane.

A modified form of one-piece blank suitable for forming a unitary member constituting an interior assembly defining adjacent longitudinal rows of article receiving compartments is shown in FIGURES 13–18.

Figure 13:
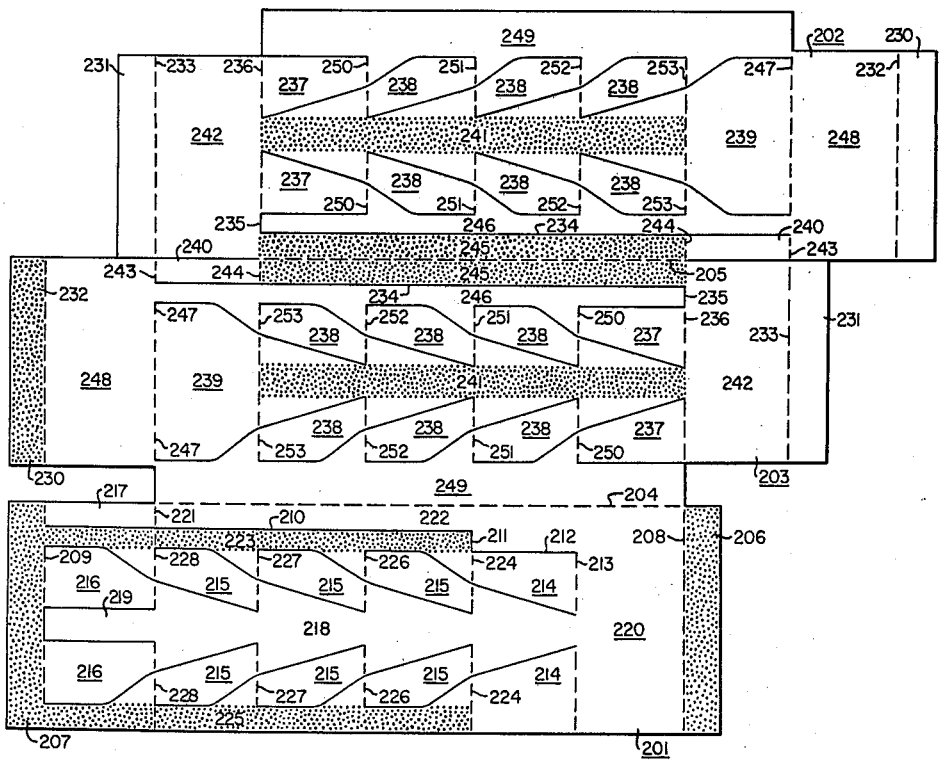
FIGURE 13 is a plan view of a modified form of one-piece blank, before folding thereof has occurred, from which an interior assembly defining three adjacent longitudinal rows of article receiving compartments is formed.
Figure 14:
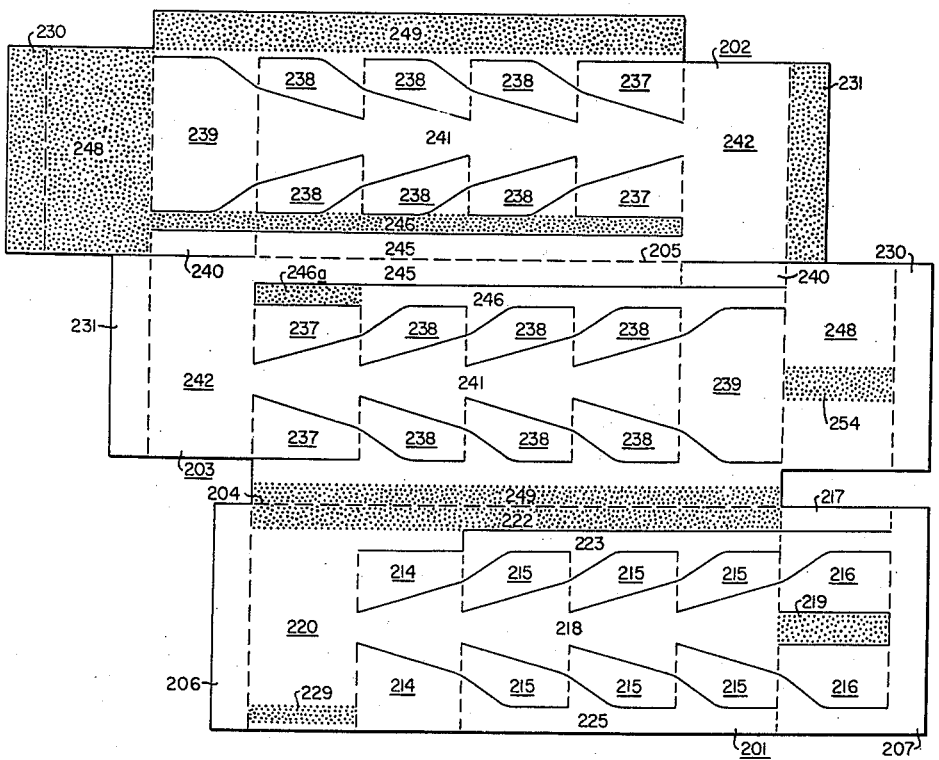
FIGURE 14 is a plan view of the obverse side of the one-piece blank shown in FIGURE 13.

As will be seen from FIGURES 13 and 14, the one-piece blank shown therein is cut and scored to a pair of outer main panels 201, 202, spaced apart by an intermediate main panel 203. The outer main panel 201 is connected to the intermediate main panel 203 by a common score line 204, whereas the intermediate main panel 203 is connected to the remaining outer main panel 202 by means of a common score line 205.

The main panel 201 is scored so as to provide a pair of hingeable end tabs 206, 207 respectively connected to opposite ends of said main panel by score lines 208, 209.

Spaced from, and parallel with, the common score line 204, is an incision 210 one end of which terminates at the score line 209 which is at right angles thereto. The other end of the incision 210 terminates in, and is connected to, a second incision 211 at right angles thereto which itself terminates in, and is connected to, a third incision 212 parallel with the incision 210 and common score line 204. The end of the third incision 212, remote from the incision 211, terminates in a score line 213 parallel with the score lines 208, 209.

The outer main panel 201 is also cut and scored to provide a plurality of secondary portions 214–216 arranged in two adjacent longitudinally extending series spaced apart by an intermediate panel 218 one end of which terminates in a tab 219 and the other end of which terminates in an ancillary panel 220 located between the score lines 208 and 213. A further secondary portion 217 is provided defined by a portion of one marginal edge of the outer main panel 201, the score line 209 and a further score line 221 parallel with the latter.

The portion of the outer main panel 201 extending between the common score line 204 and the incisions 210, 211 and 212 on the one hand, and between the score lines 213 and 221 on the other hand, constitutes a panel 222.

The portion of the outer main panel 201 located between the incision 210 and the adjacent series of secondary portions 215, 216 and terminating at one end in the score line 209 and at the other in the incision 211 constitutes a further panel 223.

The portion of the outer main panel 201 located between its free marginal edge and the adjacent series of secondary portions 215, 216 and terminating at one end in the score line 209 and, at the other end, in a score line 224 contiguous with the incision 211, constitutes another panel 225. As will thus be seen, each of the panels 223, 225 terminates, at the end remote from the tab 207, in one of the secondary portions 214.

Each of the secondary portions 214 is hingeably and integrally connected at one end to the ancillary panel 220 by means of the score line 213 and, at the other end, to an associated panel 223, 225 by the score line 224. The pair of secondary portions 215 adjacent to the secondary portions 214, are each hingeably and integrally connected at one end to the intermediate panel 218 by the score line 224 and, at the other end, to an associated panel 223, 225 by a score line 226. One end of each of the remaining secondary portions 215 is hingeably and integrally connected to the intermediate panel 218 respectively, by means of the score line 226 and a further score line 227, and the other end of each of the remaining secondary portions 215 is hingeably and integrally connected to an associated panel 223, 225, by means of the score line 227 and a further score line 228.

One end of each of the secondary portions 216 is hingeably and integrally connected to the intermediate panel 218 by means of the score line 228, whilst the other end of each said secondary portion 216 is hingeably and integrally connected to the hingeable end tab 207 by means of the score line 209. The secondary portion 217 is hingeably and integrally connected, at one end thereof, to the hingeable end tab 207 by means of the score line 209 and, at the other end, to the panel 222 by means of the score line 221.

As will be seen from FIGURE 13, one face of the end tabs 206, 207 and panels 223 and 225 is coated with pressure sensitive adhesive whereas, as shown in FIGURE 14, the obverse face of the panel 222 and tab 219 is coated with pressure sensitive adhesive. As also shown in FIGURE 14, a strip 229 of pressure sensitive adhesive is provided on the obverse face of the ancillary panel 220.

The panel 222 of the outer main panel 201, the intermediate panel 218 and tab 219, and the ancillary panel 220 constitute a first primary portion of said outer main panel, and the panels 223, 225 and connecting end tab 207 all constitute a second primary portion of said outer main panel 201.

As the remaining outer main panel 202 and the intermediate main panel 203 are scored and incised in an identical manner, the same reference numerals be used for each. Referring now to FIGURES 13 and 14, it will be seen that the remaining two main panels 202, 203 are each provided with a hingeable end tab 230, 231 at either end thereof respectively connected to their main panel along score lines 232, 233, and an incision 234 parallel with and adjacent to the common score line 205, one end of each incision 234 terminating at the score line 233 whilst the other end of each incision terminates in an incision 235 parallel with the score line 233, said incision 235 being contiguous with a score line 236.

The remaining outer main panel 202 and the intermediate main panel 203 are each cut and scored to provide a plurality of secondary portions 237–239 arranged in two adjacent longitudinally extending series spaced part by an intermediate panel 241 one end of which terminates in an ancillary portion 242 located between the score lines 233 and 236. A further secondary portion 240 is provided on each main panel 202, 203, said secondary portion 240 thereof being defined by a portion of one marginal edge of each said outer main panel, a score line 243 and a further score line 244 parallel with the latter.

The portion of each main panel 202, 203 bounded by the common score line 205 and incision 234 and terminating at either end in the score line 244 and incision 235, constitutes a panel 245. The portion of each main panel 202, 203 located between the incisions 234, 235 and adjacent longitudinally extending series of secondary portions 237–239 constitutes a further panel 246. The portion of each main panel 202, 203 located between the score line 232 and a further score line 247 contiguous with the score line 243 constitutes an ancillary panel 248 whilst the portion of the outer main panel 202 located between its free marginal edge and the adjacent associated longitudinally extending series of secondary portions 237–239 constitutes a further panel 249 as does a similar portion of the intermediate main panel 203 located between the common score line 204 and the adjacent associated longitudinally extending series of secondary portions 237–239 of said intermediate main panel 203.

Thus each of the secondary portions 237 of each of the main panels 202, 203 is hingeably and integrally connected, at one end thereof, to the adjacent ancillary panel 242 by means of the score line 236 and, at the other end thereof, to an associated panel 246, 249 by a score line 250. Each secondary portion 238, adjacent to each secondary portion 237 of each main panel 202, 203, is connected at one end by the score line 250 to the adjacent intermediate panel 241 and, at the other end, to an associated panel 246, 249 by means of a score line 251. One end of each of the remaining secondary portions 238 of each main panel 202, 203 is hingeably and integrally connected to the intermediate panel 241 respectively, by means of the score line 251 and a further score line 252, and the other end of each of the said remaining secondary portions 238 is hingeably and integrally connected to an associated panel 246, 249 by means of the score line 252 and a further score line 253. One end of each secondary portion 239 of each main panel 202, 203 is hingeably and integrally connected to its associated intermediate panel 241 by the score line 253 whereas the other end is hingeably and integrally connected to the ancillary panel 248 by means of the score line 247. The secondary portion 240 of each main panel 202, 203 is hingeably and integrally connected, at one end thereof, to its associated ancillary panel 248, and the other end is hingeably and integrally connected to the panel 245 by means of the score line 244.

As will be seen from FIGURE 13, one face of the intermediate panel 241 and panel 245 of the main panels 202, 203 and one face of the tab 230 of the latter main panel, is coated with pressure sensitive adhesive. On the other hand, as will be seen from FIGURE 14, the obverse face of the tabs 230, 231, panels 246, 249 and ancillary panel 248 of the outer main panel 202, is coated with pressure sensitive adhesive. Similarly, and as will also be seen from FIGURE 14, the obverse face of end tab 231 and panel 249 of the intermediate main panel 203 are also coated with pressure sensitive adhesive, as is a portion 246a of the length of the panel 246 and a strip 254 on the obverse face of the ancillary panel 248 of said intermediate main panel 203.

The panels 246, 249 and ancillary panel 248 of the remaining outer main panel 202 thereby constitute a second primary portion of said main panel terminating, at the end remote from the ancillary panel 248, in the secondary portions 237, and the intermediate panel 241, panel 245 and ancillary panel 242 form a first primary portion of said remaining outer main panel 202.

The panels 246, 249 and ancillary panel 248 of the intermediate main panel 203 constitute a first primary portion of the latter, and the intermediate panel 241, panel 245 and ancillary panel 242 form a second primary portion of said intermediate main panel 203 terminating, at the end remote from the ancillary panel 248, in the secondary portions 237.

Figure 15:
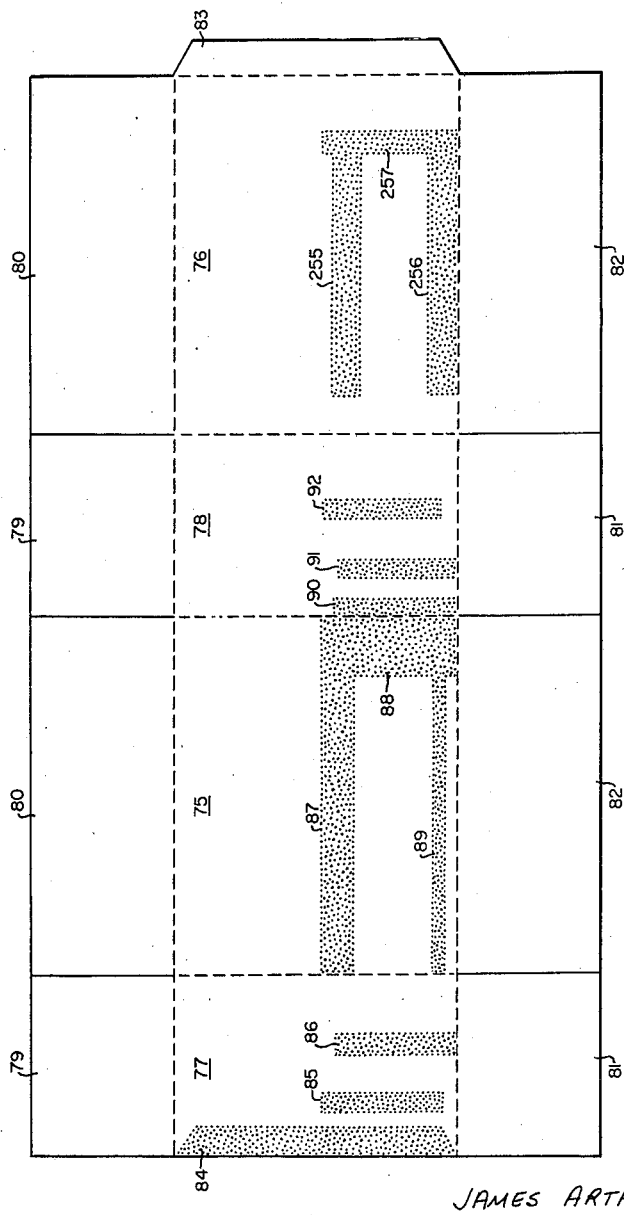
FIGURE 15 is a plan view of the blank from which the wall structure of the carton, associated with the blank shown in FIGURES 13 and 14, is formed.

The carton blanks shown in FIGURE 15 is scored and incised in a similar manner to those shown in FIGURES 3 and 9 and thus the corresponding integers thereof, insofar as possible, bear the same reference numerals. However, the width of each end wall 77, 78 is the same as the width of each end wall of the carton blank shown in FIGURE 3. The only difference then, between the carton blank shown in FIGURE 3 and that shown in FIGURE 15 is that in the latter, the side wall 76 is provided with three coated strips 255–257 of adhesive.

In forming the interior assembly from the blank shown in FIGURES 13 and 14, the main panels 201, 203 are folded along the common score line 204 so that the adhesively coated strips 219, 229 on the obverse face of main panel 201 will adhere, respectively, to the coated strips 254, 246a on the obverse face of the intermediate panel 203 and so that the adhesively coated obverse face of panel 249 of the latter will adhere to the adhesively coated obverse face of panel 222 of the outer main panel 201.

The blank is then folded along the common score line 205 and placed upon the carton blank shown in FIGURE 15 so that the adhesively coated portions of the end tabs 230, 231 of the main panels 203, 202 respectively will be in registry with the coated strips 85, 86 of the end wall 77. Simultaneously, the coated face of panel 246, 248, 249 of the outer main panel 202 will, respectively, be in registry with the coated strips 89, 88, 87 of the side wall panel 75, as will the coated surface of the hingeable tab 230 of the main panel 202 with the coated strip 90 of the end wall panel 78. Thereafter, the end tab 83 on wall 78 is folded inwardly and the said end wall 78 and side wall 76 folded over so that the coated strips 255–257 on the latter will be brought, respectively, into registry with the coated faces of panels 223, 225 and end tab 207 of the outer main panel 201, and so that the coated strips 91, 92 will be brought into registry with the coated surfaces of the end tab 231, 206 of the main panels 203, 201 respectively.

Figure 16:
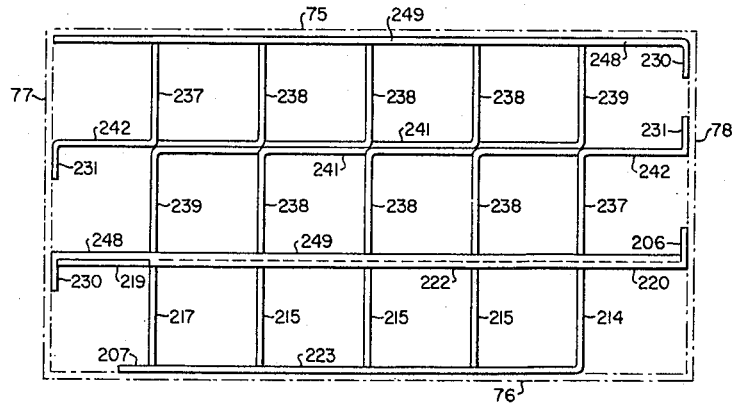
FIGURE 16 is a plan view of the interior assembly formed by the blank shown in FIGURES 13 and 14.
Figure 17:
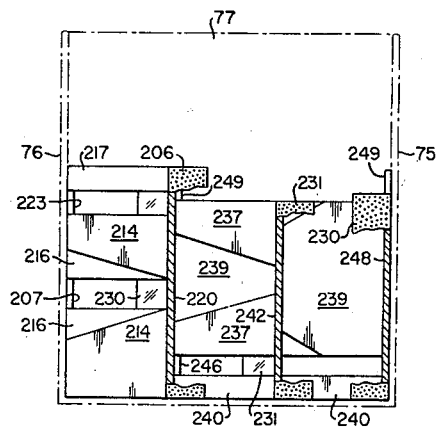
FIGURE 17 is a part-sectional end view of the interior assembly shown in FIGURE 16.
Figure 18:
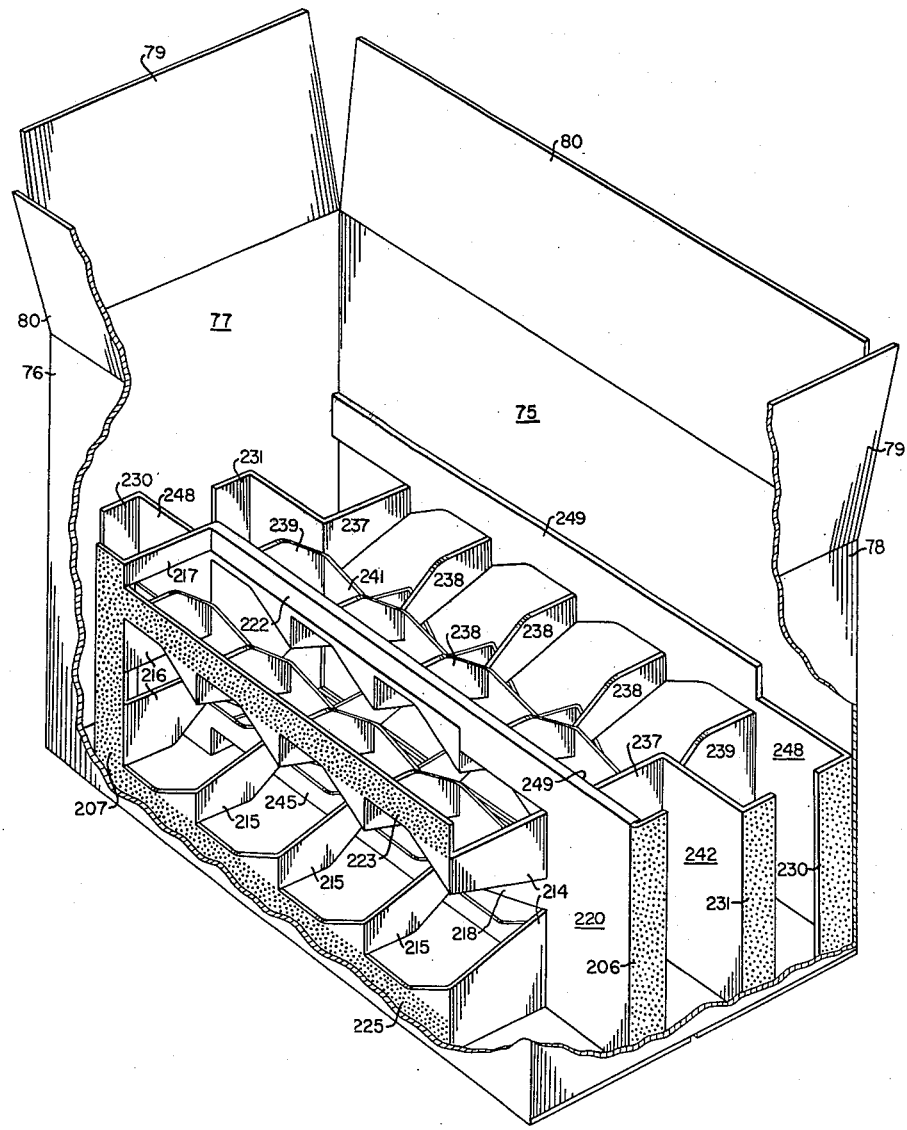
FIGURE 18 is a perspective view of the carton, partly broken away, showing the three adjacent longitudinal rows of article receiving compartments defined by the interior assembly shown in FIGURES 16 and 17.

When the components are thus positioned, pressure is brought to bear so that adhesion will occur between the various coated surfaces. When the carton is then erected, the adhesion of the components will form an interior assembly such as is shown in FIGURES 16–18 where, as will be seen, the secondary portions of each main panel will serve as transverse partitions each of which, with the exception of that formed by the secondary portions 216, 217, is constituted by two such upper and lower secondary portions disposed in a common plane.

Movement of the carton, formed from the blanks shown in FIGURES 13–15, from its knock-down condition to its erected condition will cause the second primary portion of each main panel 201—203 and the connected secondary portions to move outwardly away from the associated first primary portion of each main panel. Thus the first and second primary portions of each main panel will be parallel to one another to form a plurality of longitudinal partitions within the carton whilst the secondary portions will extend at right angles thereto so as to form a plurality of transverse partitions.

A still further modified form of one-piece blank suitable for forming a unitary member constituting an interior assembly defining adjacent longitudinal rows of article receiving compartments is shown in FIGURES 19–24.

Figure 19:
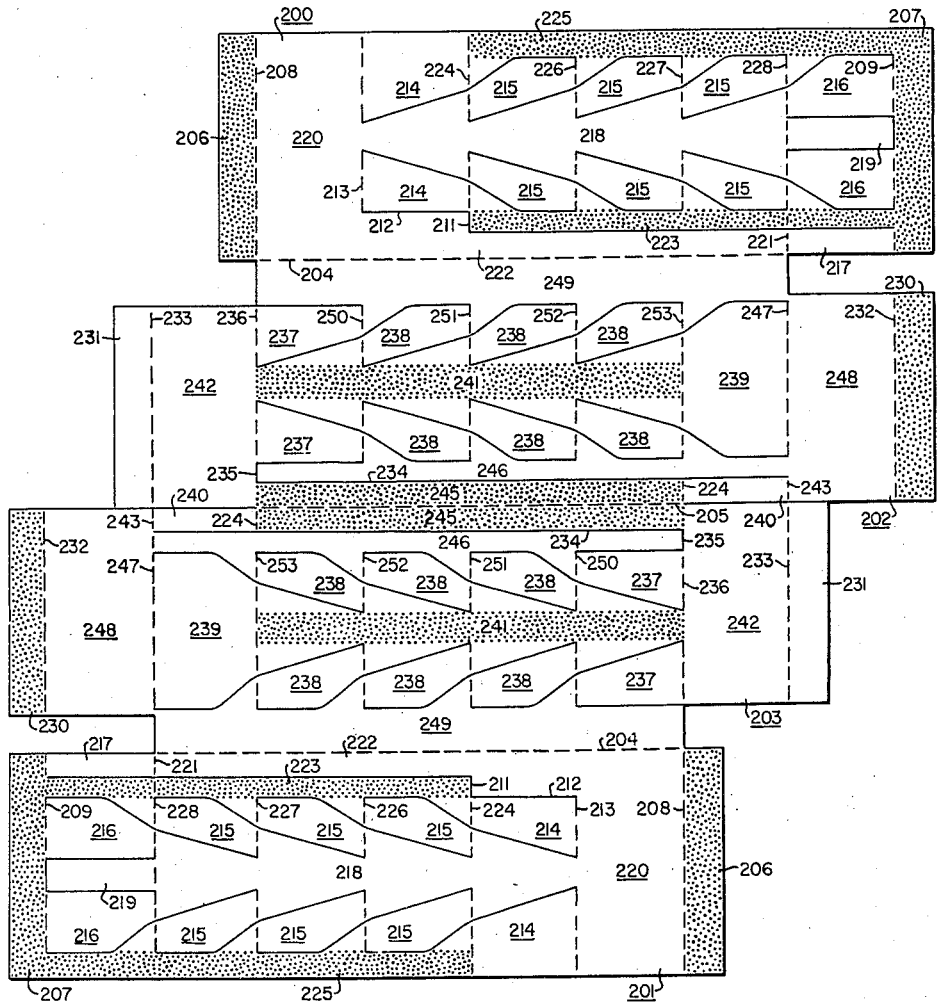
FIGURE 19 is a plan view of a modified form of one-piece blank, before folding thereof has occurred, from which an interior assembly defining four adjacent longitudinal rows of article receiving compartments is formed.
Figure 20:
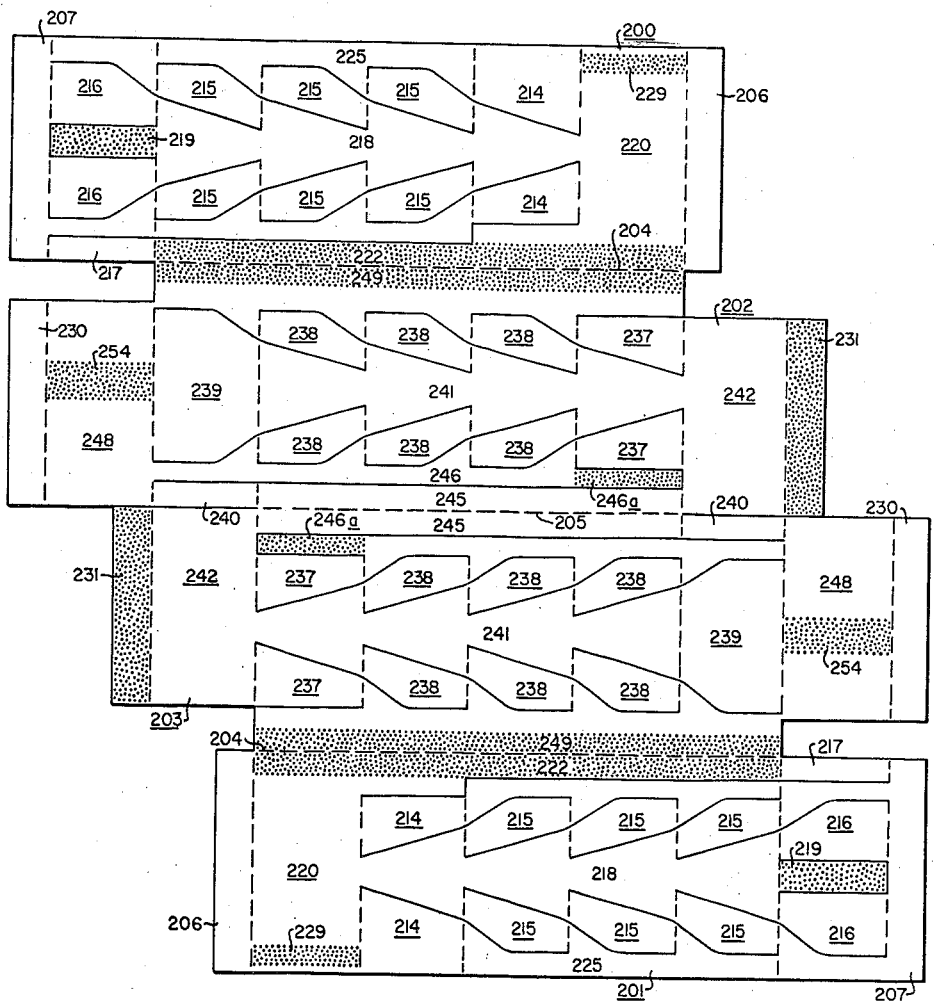
FIGURE 20 is a plan view of the obverse side of the one-piece blank shown in FIGURE 19.

As will be seen from FIGURES 19 and 20, the one-piece blank shown therein is cut and scored to a pair of outer main panels 200, 201, spaced apart by a pair of intermediate main panels 202, 203. Each outer main panel 200, 201 is connected to its adjacent intermediate main panel by a common score line 204, whereas the intermediate main panels 202, 203 are connected together by means of a common score line 205.

Each outer main panel 200, 201 is scored so as to provide a pair of hingeable end tabs 206, 207 respectively connected to opposite ends of the associated outer main panel by score lines 208, 209.

Spaced from, and parallel with, the common score line 204, is an incision 210, in each outer main panel, one end of which terminates at the score line 209 which is at right angles thereto. The other end of each incision 210 terminates in, and is connected to, a second incision 211 at right angles thereto which itself terminates in, and is connected to, a third incision 212 parallel with the incision 210 and common score line 204. The end of the third incision 212 of each outer main panel, remote from the incision 212, terminates in a score line 213 parallel with the score lines 208, 209.

Each outer main panel 200, 201 is also cut and scored to provide a plurality of secondary portions 214–216 arranged in two adjacent longitudinally extending series spaced apart by an intermediate panel 218 one end of which terminates in a tab 219 and the other end of which terminates in an ancillary panel 220 located between the score lines 208 and 213. A further secondary portion 217 is provided in each outer main panel and is defined by a portion of one marginal edge of the respective outer main panel, the score line 209 and a further score line 221 parallel with the latter.

The portion of each outer main panel 200, 201 extending between the common score line 204 and the incisions 210, 211 and 212 on the one hand, and between the score line 213 and 221 on the other hand, constitutes a panel 222.

The portion of each outer main panel 200, 201 located between the incision 210 and the adjacent series of secondary portions 215, 216 and terminating at one end in the score line 209 and at the other in the incision 211 constitutes a further panel 223.

The portion of each outer main panel 200, 201 located between its free marginal edge and the adjacent series of secondary portions 215, 216 and terminating at one end in the score line 209 and, at the other end, in a score line 224 contiguous with the incision 211, constitutes another panel 225. Each of the panels 223, 225 of each outer main panel 200, 201 thus terminates, at the end remote from the tab 207, in one of the secondary portions 214.

Each of the secondary portions 214 are hingeably and integrally connected at one end to the ancillary panel 220 by means of the score line 213 and, at the other end, to an associated panel 223, 225 by the score line 224. The pair of secondary portions 215 adjacent to the secondary portions 214, are each hingeably and integrally connected at one end to the intermediate panel 218 by the score line 224 and, at the other end, to an associated panel 223, 225 by a score line 226. One end of each of the remaining secondary portions 215 is hingeably and integrally connected to the intermediate panel 218 respectively, by means of the score line 226 and a further score line 227, and the other end of each of the remaining secondary portions 215 is hingeably and integrally connected to an associated panel 223, 225, by means of the score line 227 and a further score line 228.

One end of each of the secondary portions 216 is hingeably and integrally connected to the intermediate panel 218 by means of the score line 229, whilst the other end of each said secondary portion 216 is hingeably and integrally connected to the hingeable end tab 207 by means of the score line 209. The secondary portion 217 is hingeably and integrally connected, at one end thereof, to the hingeable end tab 207 by means of the score line 209 and, at the other end, to the panel 222 by means of the score line 221.

As will be seen from FIGURE 19, one face of the end tabs 206, 207 and panels 223 and 225 of each outer main panel 200, 201, is coated with pressure sensitive adhesive whereas, as shown in FIGURE 20, the obverse face of each panel 222 and tab 219 is coated with pressure sensitive adhesive. As also shown in FIGURE 20, a strip 229 of pressure sensitive adhesive is provided on the obverse face of each ancillary panel 220.

The panel 222 of each outer main panel 200, 201, the intermediate panel 218 and tab 219, and the ancillary panel 220, constitute a first primary portion of each of said outer main panels, and the panels 223, 225 and connecting end tab 207 all constitute a second primary portion of each of said outer main panels 200, 201.

Referring now to FIGURES 13 and 14, it will be seen that the two intermediate main panels 202, 203 are each provided with a hingeable end tab 230, 231 at either end thereof respectively connected to respective main panel along score lines 232, 233, and an incision 234 parallel with and adjacent to the common score line 205, one end of each incision 234 terminating at the score line 233 whilst the other end of each incision terminates in an incision 235 parallel with the score line 233, said incision 235 being contiguous with a score line 236.

The intermediate main panels 202, 203 are each cut and scored to provide a plurality of secondary portions 237–239 arranged in two adjacent longitudinally extending series spaced apart by an intermediate panel 241 one end of which terminates in an ancillary portion 242 located between the score lines 233 and 236. A further secondary portion 240 is provided on each intermediate main panel 202, 203, said secondary portion 240 thereof being defined by a portion of one marginal edge of each said intermediate main panel, a score line 243 and a further score line 224 parallel with the latter.

The portion of each intermediate main panel 202, 203 bounded by the common score line 205 and incision 234 and terminating at either end in the score line 224 and incision 235, constitutes a panel 245. The portion of each intermediate main panel 202, 203 located between the incisions 234, 235 and adjacent longitudinally extending series of secondary portions 237–239 constitutes a further panel 246. The portion of each intermediate main panel 202, 203 located between the score line 232 and a further score line 247 contiguous with the score line 243 constitutes an ancillary panel 248 whilst the portion of each intermediate main panel 202, 203 located between the common score line 204 and the adjacent associated longitudinally extending series of secondary portions 237–239 constitutes a further panel 249.

Thus each of the secondary portions 237 of each of the intermediate main panels 202, 203 is hingeably and integrally connected, at one end thereof, to the adjacent ancillary panel 242 by means of the score line 236, and at the other end thereof, to an associated panel 246, 249 by a score line 250. Each secondary portion 238, adjacent to each secondary portion 237 of each intermediate main panel 202, 203, is connected at one end by the score line 250 to the adjacent intermediate panel 241 and, at the other end, to an associated panel 246, 249 by means of a score line 251. One end of each of the remaining secondary portions 238 of each intermediate main panel 202, 203 is hingeably and integrally connected to the intermediate panel 241 respectively, by means of the score line 251 and a further score line 252, and the other end of each of the said remaining secondary portions 238 is hingeably and integrally connected to an associated panel 246, 249 by means of the score line 252 and a further score line 253. One end of each secondary portion 239 of each intermediate main panel 202, 203 is hingeably and integrally connected to its associated intermediate panel 241 by the score line 253 whereas the other end is hingeably and integrally connected to the ancillary panel 248 by means of the score line 247. The secondary portion 240 of each intermediate main panel 202, 203 is hingeably and integrally connected, at one end thereof, to its associated ancillary panel 248, and the other end is hingeably and integrally connected to the panel 245 by means of the score line 244.

As will be seen from FIGURE 19, one face of the intermediate panel 241 and panel 245 of the intermediate main panels 202, 203 and one face of the tabs 230 is coated with pressure sensitive adhesive. On the other hand, as will be seen from FIGURE 20, the obverse face of the tab 231 and panel 249 of each intermediate main panel 202, 203 is coated with pressure sensitive adhesive, as is a portion 246a of the length of each panel 246 and a strip 254 on the obverse face of each intermediate main panel 202, 203.

The panels 246, 249 and ancillary panel 248 of each intermediate main panel 202, 203 thereby constitute a first primary portion of each of the latter, and the intermediate panel 241, panel 245 and ancillary panel 242 of each of said intermediate main panels 202, 203 form a second primary portion of each of the latter.

Figure 21:
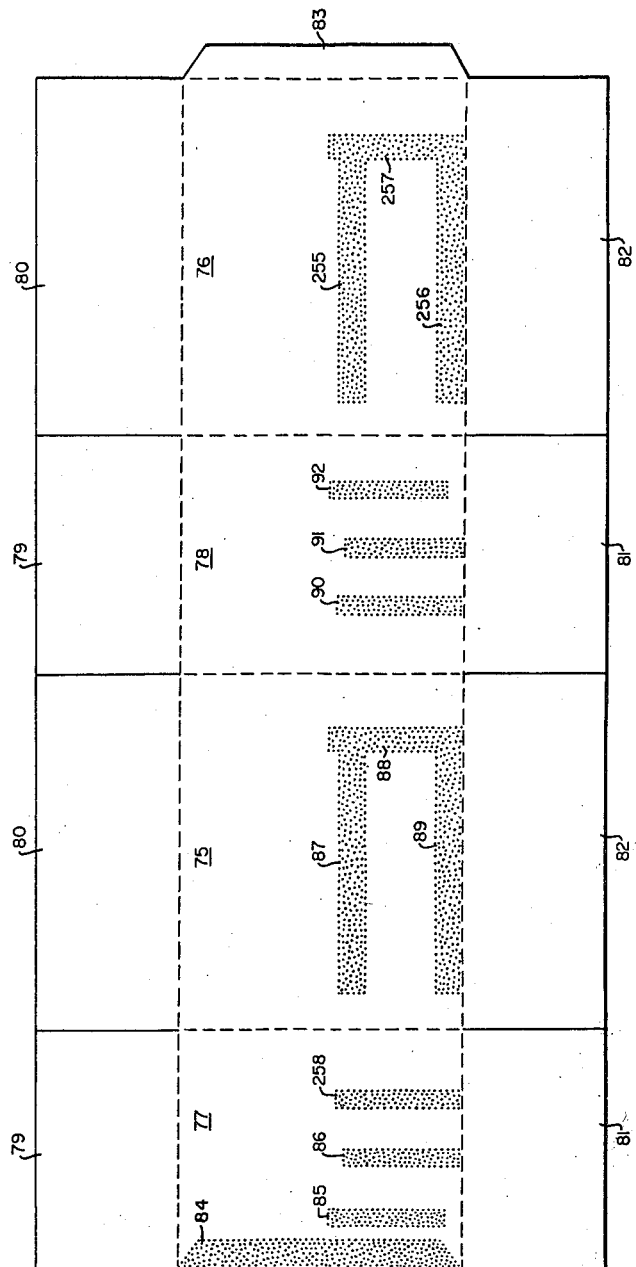
FIGURE 21 is a plan view of the blank from which the wall structure of the carton, associated with the blank shown in FIGURES 19 and 20, is formed.

The carton blank shown in FIGURE 21 is scored and incised in a similar manner to those shown in FIGURES 3, 9, and 15, and thus the corresponding integers thereof, insofar as possible, bear the same reference numerals. However, and as will be noted, the width of each end wall 77, 78 is the same as the width of each end wall of the carton blank shown in FIGURE 9. The carton blank of FIGURE 21 differs from that shown in FIGURE 15, other than the width of the end walls, in that the three strips 87–89 of pressure-sensitive adhesive on the side wall panel 75 are identical with the similarly coated strips 255–257 on the side wall 76. Moreover, the end wall panel 77 shown in FIGURE 21 is provided with an additive strip 258 of adhesive and the adhesive strips 90–92 on the end wall panel 78 are spaced a little differently to those shown in FIGURE 15.

In forming the interior assembly from the blank shown in FIGURES 19 and 20 each outer main panel 200, 201 is folded along its common score line 204 so that the adhesively coated strips 219, 229 on the obverse face thereof will adhere, respectively, to the coated strips 254, 246a on the obverse face of each adjacent intermediate panel 202, 203 and so that the adhesively coated obverse face of panel 249 of each of the latter will adhere to the adhesively coated obverse face of panel 222 of each outer main panel 200, 201.

The blank is then folded along the common score line 205 and placed upon the carton blank shown in FIGURE 21 so that the adhesively coated portions of the end tabs 206, 231, and 230 of the main panels 200, 202, 203 respectively will be in registry with the coated strips 258, 85, 86 of the end wall 77. Simultaneously the coated face of panel 225, 222 and tab 207 of the outer main panel 200 will, respectively, be in registry with the coated strips 89, 87 and 88 of the side wall panel 75. Thereafter, the end tab 83 on wall 78 is folded inwardly and the said end wall 78 and side wall 76 folded over so that the coated strips 255–257 on the latter will be brought, respectively, into registry with the coated faces of panels 223, 225 and end tab 207 of the outer main panel 201, and so that the coated strips 90–92 of the end wall panel 78 will be brought into registry with the coated surface of the end tab 230, 231, 206 of the main panels 202, 203, and 201 respectively.

Figure 22:
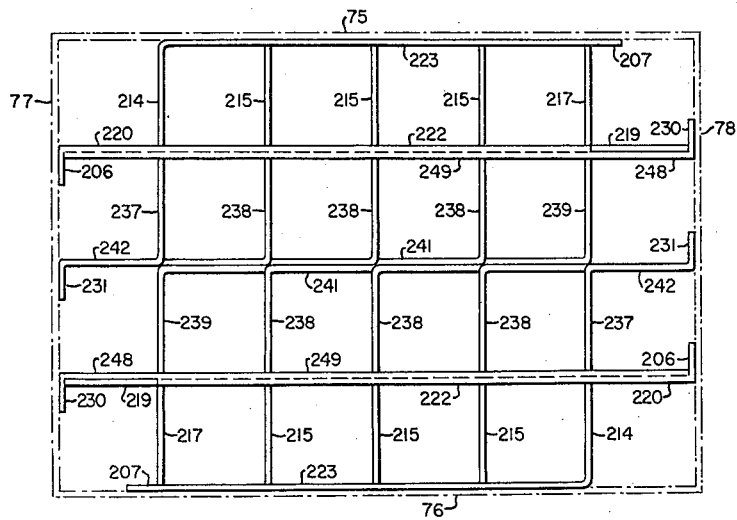
FIGURE 22 is a plan view of the interior assembly formed by the blank shown in FIGURES 19 and 20.
Figure 23:
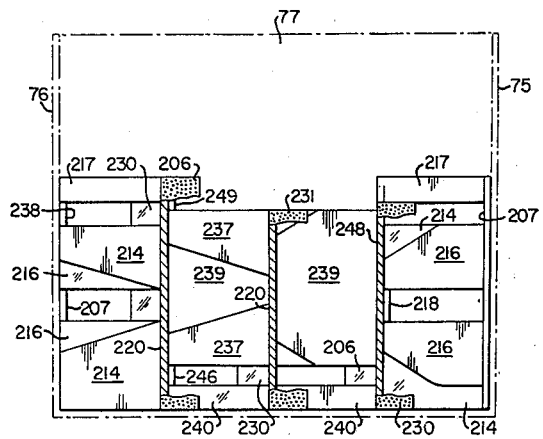
FIGURE 23 is a part-sectional end view of the interior assembly shown in FIGURE 22.
Figure 24:
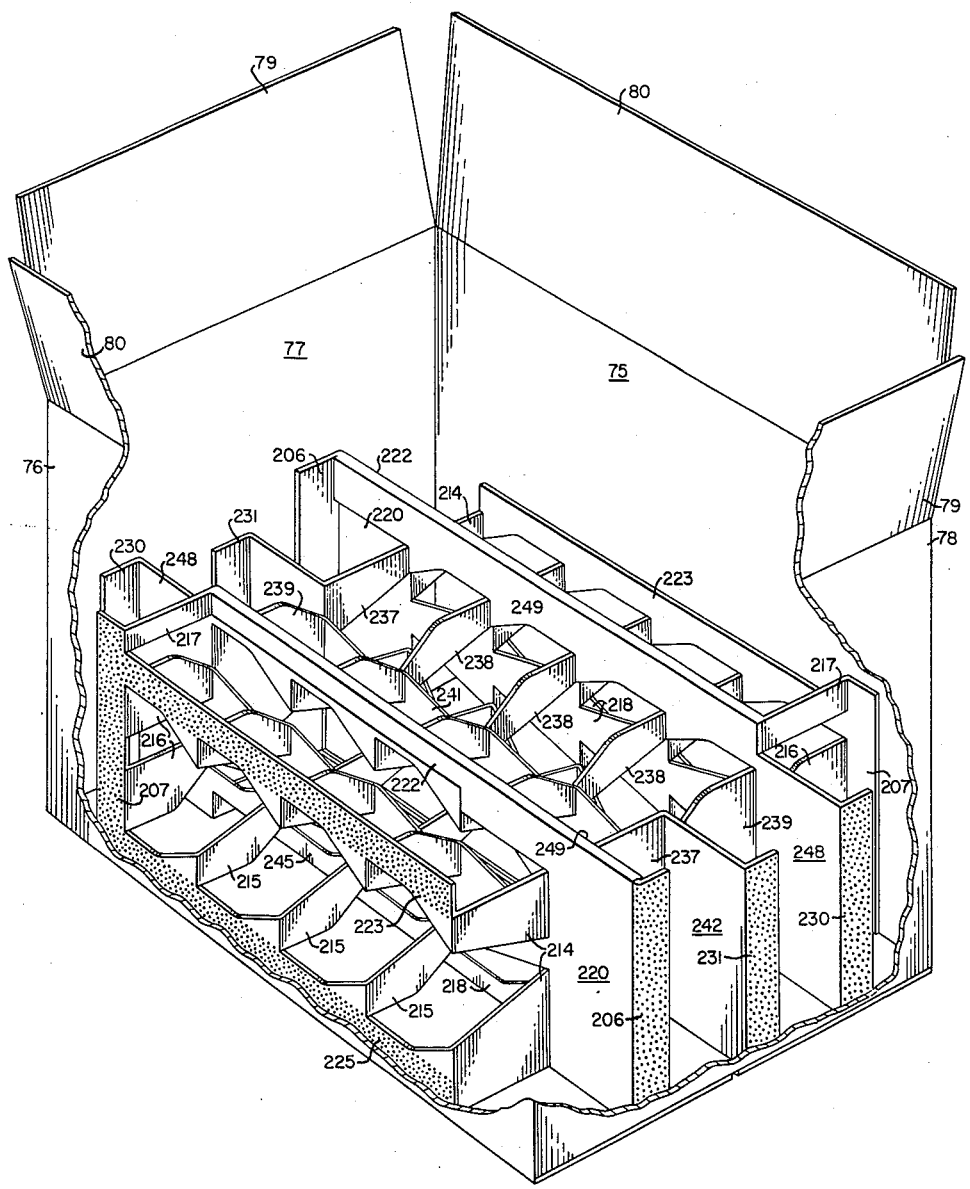
FIGURE 24 is a perspective view of the carton, partly broken away, showing the four adjacent longitudinal rows of article receiving compartments defined by the interior assembly shown in FIGURES 22 and 23.

When the components are thus positioned, pressure is brought to bear so that adhesion will occur between the various coated surfaces. When the carton is then erected, the adhesion of the components will form an interior assembly such as is shown in FIGURES 22–24. The secondary portions of each of the main panels will serve as transverse partitions each of which, with the exception of those formed by the secondary portions 216, 217, is constituted by two such upper and lower secondary portions disposed in a common plane.

With the four embodiments of blank described above and shown in FIGURES 1, 2, 7, 8, 13, 14, 19 and 20, movement of the carton from its knock-down condition to its erected condition will cause the second primary portion of each main panel and the connected secondary portions to move outwardly away from the associated first primary portion of each main panel. Thus the first and second primary portions will be parallel with one another to form a plurality of longitudinal partitions within the carton and the secondary portions will extend at right angles thereto so as to form a plurality of transverse partitions.

With the form of interior assembly blanks shown in FIGURES 1, 2, 13 and 14, the longitudinal and transverse partitions define two outer longitudinally extending rows of article receiving compartments and an intermediate row of similar compartments between said outer rows thereof. As will be appreciated, the outer longitudinal partitions will each prevent contact between predetermined areas of articles in the outer rows of compartments and an adjacent side wall, and the intermediate longitudinal partitions will each prevent contact between predetermined areas of articles in the intermediate row of compartments and the adjacent outer rows thereof.

With the form of interior assembly blanks shown in FIGURES 7, 8, 19 and 20, the longitudinal and transverse partititions define two outer longitudinally extending rows of article receiving compartments within the carton and a pair of intermediate rows of similar compartments between said outer rows thereof. The outer longitudinal partitions will each prevent contact between predetermined areas of articles in the outer rows of compartments and an adjacent side wall, the intermediate longitudinal partitions will prevent contact between predetermined areas of articles in an intermediate row of compartments and an adjacent outer row thereof, and the median longitudinal partitions will prevent contact between predetermined areas of articles in the adjacent intermediate rows of compartments.

With all four embodiments of interior assembly blanks, the second primary portion (i.e. 9 and 70, 72 and 73 of FIGURE 1) of each outer main panel forms an outer longitudinal partition secured to an adjacent side wall of the carton whilst, in connection with the forms of blank shown in FIGURES 1, 2, 13 and 14, the first primary portion (i.e. 6, 7 and 8 of FIGURE 1) of one outer main panel is adhesively secured to the first primary portion (i.e. 43, 47, 48 of FIGURE 1), constituting a second longitudinally extending panel, of the intermediate main panel to constitute a first longitudinally extending panel. The first primary portion (i.e. 56, 57 and 71 of FIGURE 1) of the remaining outer main panel of the blanks shown in FIGURES 1, 2, 13 and 14 is adhesively secured to the second primary portion (i.e. 31, 32 and 46 of FIGURE 1), of the intermediate main panel so as to form a second longitudinally extending panel. Both of said adhesively secured pairs of first and second longitudinally extending panels constitute a pair of intermediate longitudinal partitions between the mutually opposed outer longitudinal partitions.

In connection with the two forms of interior assembly blank shown in FIGURES 7, 8, 19 and 20, the first primary portion of each outer main panel is adhesively secured to the first primary portion of an adjacent intermediate main panel so as to form a pair thereof, each adhesively secured pair constituting an intermediate longitudinal partition between the mutually opposed longitudinal partitions. The second primary portions of the pair of intermediate main panels constitute an additional pair of longitudinally extending panels adhesively secured together to serve as a median longitudinal partition.

With the type of interior assembly blank shown in FIGURES 1 and 2, the panel 9 constituting part of the outer longitudinal partition formed by the second primary portion of the first outer main panel 1 is located between and connected to one end of each upper and lower pair of secondary portions 12, 13 of the related outer row of compartments and to one end of the single secondary portion 14. Moreover, as will be seen from FIGURE 6, the first longitudinally extending panel formed by the first primary portion of the outer main panel is provided with an upper longitudinally extending portion, constituted by the portion 6, connecting the other ends of the upper secondary portions 12, 13 with one another, and a lower longitudinally extending portion, constituted by the portion 7, connecting the other ends of the lower secondary portions 12, 13 with one another, the ancillary portion 8 connecting the upper and lower longitudinally extending portions 6, 7 together as well as connecting the other end of the single secondary portion 14 with the said first longitudinally extending panel.

Figure 5:
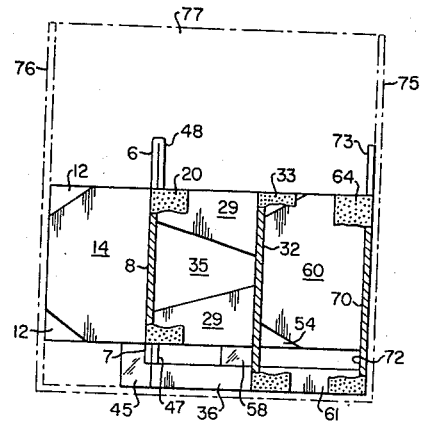
FIGURE 5 is a part-sectional end view of the interior assembly shown in FIGURE 4.
Figure 6:
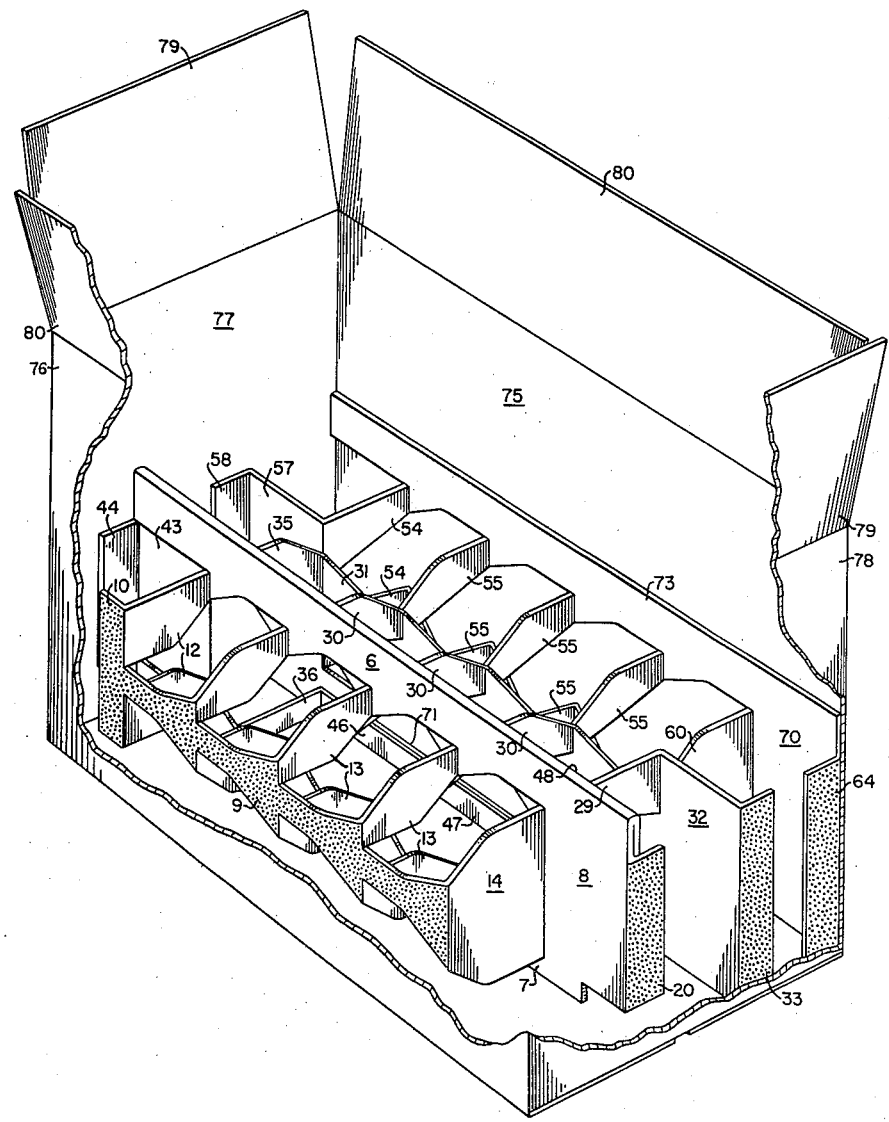
FIGURE 6 is a perspective view of the carton, partly broken away, showing the three adjacent longitudinal rows of article receiving compartments defined by the interior assembly.

As will also be seen from FIGURES 5 and 6, the second longitudinally extending panel formed by the second primary portion of the intermediate main panel 3 is provided with an upper longitudinally extending portion, constituted by the portion 48, connecting one end of the upper secondary portions 29, 30 of the intermediate row of compartments with one another. The said second longitudinally extending panel is also provided with a lower longitudinally extending portion constituted by the portion 47, connecting together one end of the lower secondary portions 29, 30, the ancillary portion 43 connecting the upper and lower longitudinally extending portions 48, 47 together as well as connecting one end of the pair of secondary portions 35, 36 together.

FIGURES 5 and 6 also show that the remaining outer longitudinal partition formed by the second primary portion of the other outer main panel 2 is provided with an upper longitudinally extending portion 73 connecting together one end of the upper secondary portions 54, 55, as well as a lower longitudinally extending portion 72, connecting together one end of the lower secondary portions 54, 55, the ancillary portion 70 connecting together said upper and lower longitudinally extending portions as well as connecting one end of the single secondary portion 60 thereto. The first longitudinally extending panel, formed by the first primary portion of the remaining outer main panel 2, is also provided with an upper longitudinally extending portion 56 connecting together the other ends of the upper and lower secondary portions 54, 55 and which is attached to the other end of the upper secondary portion 60, and a lower longitudinally extending portion 71. The ancillary portion 57 connects the upper and lower longitudinally extending portions 56, 71 together and the lower longitudinally extending portion 71 connects the other end of the lower secondary portion 61 to the ancillary portion 57.

The second longitudinally extending panel, formed by the first primary portion of the intermediate main panel 3 and which is adhesively secured to the first longitudinally extending panel of the outer main panel 2, is provided with an upper longitudinally extending portion 31 connecting together the other ends of the upper and lower secondary portions 29, 30 of the intermediate row of compartments and which is attached to the other end of the upper secondary portion 35, and a lower longitudinally extending portion 46. The ancillary portion 32 connects the upper and lower longitudinally extending portions 31, 46 together and the lower longitudinally extending portion 46 connects the other end of the lower secondary portion 36 of the intermediate row of compartments to the ancillary portion 32.

With the types of interior assembly blank shown in FIGURES 7 and 8, it will be seen that the panel 110 constituting part of each outer longitudinal partition formed by the second primary portion of each of the outer main panels, is located between and connected to one end of each upper and lower pairs of secondary portions 113, 114 of the related outer row of compartments and to one end of its associated single secondary portion 115. Moreover, as will be seen from FIGURE 12, the first longitudinally extending panel formed by the first primary portion of each outer main panel 100, 101, is provided with an upper longitudinally extending portion, constituted by the portion 107, connecting the other ends of the associated upper secondary portions 113, 114 of each outer row of compartments with one another, and a lower longitudinally extending portion, constituting the portion 108, connecting the other ends of the associated lower secondary portions 113, 114 of each outer row of compartments with one another, the ancillary portion 109 of each outer main panel 100, 101 connecting each upper and lower longitudinally extending portions 107, 108 together as well as connecting the other end of its associated single secondary portion 115 with the said first longitudinally extending panel.

Figure 11:
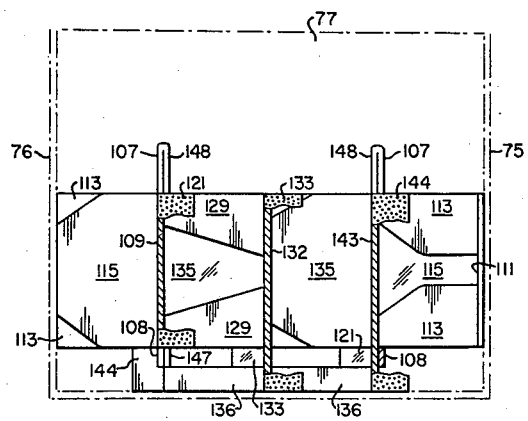
FIGURE 11 is a part-sectional end view of the interior assembly shown in FIGURE 10.
Figure 12:
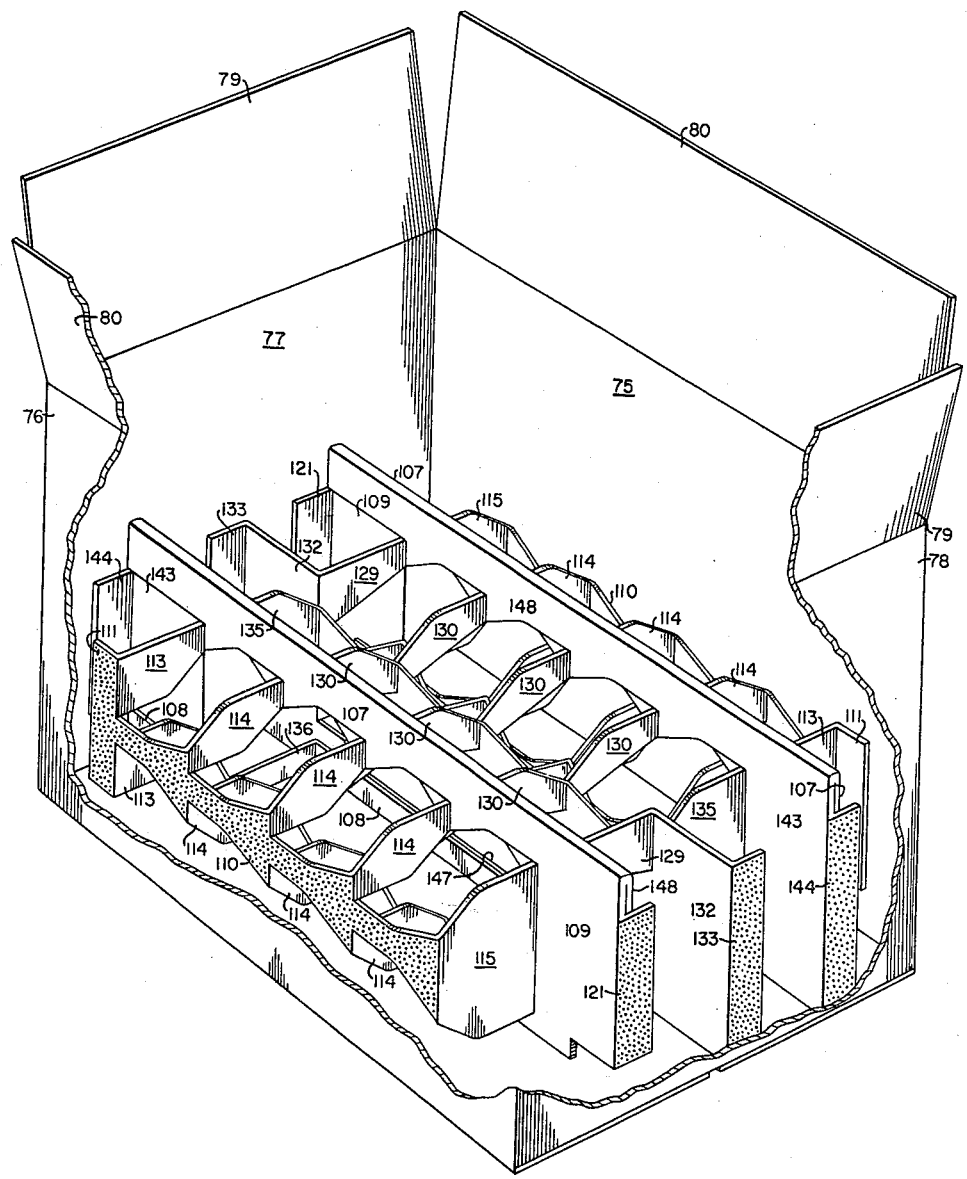
FIGURE 12 is a perspective view of the carton, partly broken away, showing the four adjacent longitudinal rows of article receiving compartments defined by the interior assembly shown in FIGURES 10 and 11.

As will also be seen from FIGURES 11 and 12, each second longitudinally extending panel formed by the first primary portion of each intermediate main panel 102, 103 is provided with an upper longitudinally extending portion, constituted by the portion 148, connecting one end of the upper secondary portions 129, 130 of the associated intermediate row of compartments with one another. Each second longitudinally extending panel, formed by the first primary portion of each intermediate main panel, is also provided with a lower longitudinally extending portion, constituted by the portion 147, connecting together one end of the lower secondary portions 129, 130 of each intermediate row of compartments, each ancillary portion 143 connecting its associated upper and lower longitudinally extending portions 148, 147 together as well as connecting one end of the pair of secondary portions 135, 136 of the associated intermediate row of compartments together. The secondary primary portion of each intermediate main panel 102, 103 each constitutes an additional longitudinally extending panel and, as will be recalled, the second primary portions of the intermediate main panels are adhesively secured together. Thus, each additional longitudinally extending panel is provided with an upper longitudinally extending portion, constituted by the panel 131, connecting together the other ends of the upper and lower secondary portions 130 of its associated intermediate row of compartments, said upper longitudinally extending portion also being attached to the other end of the upper secondary portion 135 of said intermediate row of compartments. Each additional longitudinally extending panel is also provided with a lower longitudinally extending portion, constituted by the portion 146, and the ancillary portion 132 of each of said intermediate main panels 102, 103 connects together its associated upper and lower longitudinally extending portions and also connects together the other end of its associated pair of upper and lower secondary portions 129, said lower longitudinally extending portion 146 connecting the other end of the lower secondary portion 136 with said ancillary portion 132.

With the type of interior assembly blank shown in FIGURES 13 and 14, the panel 223 which forms part of the outer longitudinal partition formed by the second primary portion (223, 207, 225) of the outer main panel 201 constitutes an upper longitudinally extending portion (see FIGURE 17) connecting one end of the upper secondary portions 214, 215 of the related outer row of compartments together. Moreover, the panel 225 also forming part of the outer longitudinal partition constitutes a lower longitudinally extending portion connecting one end of the lower secondary portions 214, 215 together. The tab 207 of the outer main panel 201 also forms part of the outer longitudinal partition and serves as an ancillary portion connecting said upper and lower longitudinally extending portions together as well as connecting together one end of the three secondary portions 216, 217 disposed in a common plane.

The first longitudinally extending panel formed by the first primary portion of the outer main panel 201 is provided with an upper longitudinally extending portion, constituted by the panel 222, connected to the other end of the secondary portion 217. The first longitudinally extending panel is also provided with a lower longitudinally extending portion, constituted by the panel 218 of the outer main panel 201 connecting together the other end of the two secondary portions 216 and the other ends of the upper and lower secondary portions 215. The first longitudinally extending panel is also provided with an ancillary portion, constituted by the ancillary panel 220 of the outer main panel 201, connecting the upper and lower longitudinally extending portions together of the first longitudinally extending panel and also connecting together the other ends of the upper and lower secondary portions 214.

The secondary longitudinally extending panel formed by the first primary portions 241, 242 of the intermediate main panel 203 is provided with an upper longitudinally extending portion, constituted by the panel 249 of said main panel 203, which connects together one end of the upper secondary portions 237, 238 of the intermediate row of compartments. The said second longitudinally extending panel is also provided with a lower longitudinally extending portion, constituted by the panel 241, which connects one end of the lower secondary portions 237, 238 of the intermediate row of compartments together. The said second longitudinally extending panel is also provided with an ancillary portion, constituted by the ancillary panel 248, connecting together said upper and lower longitudinally extending portions together and which also connects together one end of the secondary portions 239, 240.

The panel 249 constituting part of the remaining outer longitudinal partition formed by the second primary portion of the remaining outer main panel 202 constitutes an upper longitudinally extending portion connecting one end of the upper secondary portions 237, 238 of the remaining outer row of compartments together. Moreover, the panel 246 also forming part of the remaining outer longitudinal partition constitutes a lower longitudinally extending portion connecting together one end of the lower secondary portions 237, 238. The remaining outer longitudinal partition also includes an ancillary portion, constituted by the ancillary panel 248 of the outer main panel 202, which connects the upper and lower longitudinally extending portions together and also connects together one end of the secondary portions 239, 240.

The first longitudinally extending panel formed by the first primary portion of the remaining outer main panel 202 has an upper longitudinally extending portion, constituted by the panel 241, connecting together the other ends of the secondary portions 238, 239. The first longitudinally extending panel is also provided with a lower longitudinally extending portion, constituted by the panel 245, which is attached to the other end of the lower secondary portion 240 of the remaining outer row of compartments. The first longitudinally extending panel is also provided with an ancillary portion, constituted by the ancillary panel 242 of the remaining outer main panel 202, which connects the said upper and lower longitudinally extending portions together and also connects together the other ends of the upper and lower secondary portions 237.

The second longitudinally extending panel associated with the first longitudinally extending panel is formed by the intermediate main panel 203 and is provided with an upper longitudinally extending portion, constituted by the panel 241 secured to the panel 241 of the remaining outer main panel 202, said upper longitudinally extending portion connecting together the other ends of the secondary portions 238, 239 of the intermediate row of compartments. A lower longitudinally extending portion is also provided, constituted by the panel 245 of the intermediate main panel 203, which is attached to the other end of the lower secondary portion 240 of the intermediate row of compartments. An ancillary portion is also provided, constituted by the ancillary panel 242 of the intermediate main panel 203, which connects the upper and lower longitudinally extending portions together and which also connects the other ends of the pair of upper and lower secondary portions 237 together.

With the type of interior assembly blank shown in FIGURES 19 and 20, the panel 223 of each outer main panel 200, 201 forms part of each outer longitudinal partition and constitutes an upper longitudinally extending portion connecting together one end of the upper secondary portions 214, 215 of each outer row of compartments. Each panel 225 also forming part of each outer longitudinal partition constitutes a lower longitudinally extending portion connecting together one end of the lower secondary portions 214, 215 of each outer row of compartments. The tab 207 of each outer main panel 200, 201 connects its related upper and lower longitudinally extending portions together as well as connecting together one end of the three secondary portions 216, 217 disposed in a common plane, of each outer row of compartments.

The first longitudinally extending panel formed by the first primary portion of each outer main panel 200, 201 is provided with an upper longitudinally extending portion, constituted by the panel 222, connected to the other end of the secondary portion 217 of each outer row of compartments. Each first longitudinally extending panel is also provided with a lower longitudinally extending portion, constituted by the panel 218 of each outer main panel 200, 201 connecting together the other end of the two secondary portions 216 and the other ends of the upper and lower secondary portions 215 of each outer row of compartments. Each first longitudinally extending panel is also provided with an ancillary portion, constituted by the ancillary panel 220 of each outer main panel 200, 201 connecting the upper and lower longitudinally extending portions together of each first longitudinally extending panel and also connecting together the other ends of the upper and lower secondary portions 214 of each outer row of compartments.

Each second longitudinally extending panel formed by the first primary position of each intermediate main panel 202, 203 is provided with an upper longitudinally extending portion, constituted by the panel 249, which connects together one end of the upper secondary portions 237, 238 of each intermediate row of compartments. Each said second longitudinally extending panel is also provided with a lower longitudinally extending portion, constituted by the panel 249 of each intermediate main panel, which connects one end of the lower secondary portions 237, 238 of each intermediate row of compartments together. Each said second longitudinally extending panel is also provided with an ancillary portion, constituted by the ancillary panel 248 of each intermediate main panel 202, 203, connecting said upper and lower longitudinally extending portions together and which also connects together one end of the secondary portions 239, 240 of each intermediate row of compartments.

The second primary portion of each intermediate main panel forms an additional longitudinally extending panel having an upper longitudinally extending portion constituted by the panel 241 connecting together the other ends of the secondary portions 238, 239 of each intermediate row of compartments. Each additional panel is also provided with a lower longitudinally extending portion, constituted by the panel 245 of each intermediate main panel 202, 203, which is attached to the other end of the lower secondary portion 240 of each intermediate row of compartments. Each additional panel is also provided with an ancillary portion, constituted by the ancillary panel 242 of each intermediate main panel 202, 203, which connects the said upper and lower longitudinally extending portions of each additional panel together and which also connects together the other ends of the upper and lower secondary portions 237 of each intermediate row of compartments.

I claim:

1. A one-piece blank adapted to form a unitary member constituting an interior assembly defining a plurality of rows of adjacent article receiving compartments within a carton having a wall structure including mutually opposed side and end walls and a bottom; said blank being cut and scored to provide a pair of outer main panels spaced apart by at least one intermediate main panel all of said main panels being integrally connected together in side-by-side relationship and sequentially stepped with respect to each other; a plurality of score lines, each of which is common to a respective adjacent pair of main panels and extends longitudinally therebetween; each of said main panels being cut and scored to provide at least a first primary portion and at least a second primary portion; each of said main panels being further cut and scored to provide a plurality of secondary portions each serving hingeably and integrally to connect said first primary portion with said second primary portion; said second primary portion of each main panel and its connected secondary portions being adapted to be moved outwardly from said first portion of each main panel; each said second primary portion thereby extending parallel to its said first primary portion and the said secondary portions of each main panel thereby extending between and at right angles to its connected first and second primary portions; said second primary portion of each of said outer main panels, when said blank is folded along said common score lines and united with a blank forming the wall structure of the carton, being adapted to be secured in face-to-face contact with an adjacent side wall of the carton to serve as an outer longitudinal partition; said first primary portion of one of said outer main panels upon said uniting, being secured to a selected primary portion of said intermediate main panel and being in face-to-face contact therewith throughout its length; said first primary portion of the remaining outer main panel, upon said uniting, being secured to the remaining primary portion of said intermediate main panel and being in face-to-face contact therewith throughout its length; said first primary portion of each outer main panel and said primary portions of said intermediate panel serving as a pair of spaced intermediate longitudinal partitions between said outer pair of longitudinal partitions; said outer longitudinal partitions each preventing contact between predetermined areas of articles in the outer rows of compartments and the associated adjacent side wall of the carton, and said intermediate longitudinal partitions each preventing contact between predetermined areas of articles in an intermediate row of compartments and an adjacent outer row thereof.

2. A one-piece blank according to claim 1 wherein each of said main panels is cut and scored to provide end tabs thereon adapted, upon said uniting, to be secured to an adjacent end wall of the carton.

3. A one-piece blank according to claim 1 wherein each of said main panels is cut and scored to provide at least a pair of adjacent longitudinal series of secondary portions spaced by a part of said second primary portion and a plurality of score lines connecting each of said secondary portions with each main panel; certain of said transverse partitions of each outer main panel, upon said uniting and outward movement of said secondary portions, being constituted by upper and lower secondary portions disposed in a common plane.

4. A one-piece blank according to claim 3 wherein one of said outer main panels is cut and scored whereby one end of its said second primary portion terminates in a secondary portion hingeably and integrally connected to said first and second primary portions of said outer main panel and serving, upon said uniting, as a further transverse partition.

5. A one-piece blank according to claim 4 wherein each intermediate main panel is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

6. A one-piece blank according to claim 3 wherein each of said outer main panels is cut and scored whereby one end of each second primary portion of each outer main panel terminates in a secondary portion hingeably and integrally connected to said first and second primary portions of each said outer main panel and serving, upon said uniting, as a further transverse partition.

7. A one-piece blank according to claim 6 wherein each of said intermediate main panels is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

8. A one-piece blank according to claim 3 wherein one of said outer main panels is cut and scored whereby one end of its second primary portion terminates in at least a pair of secondary portions each hingeably and integrally connected to said first and second primary portions of said one outer main panel and serving, upon said uniting, as a further transverse partition constituted by said pair of secondary portions disposed in a common plane.

9. A one-piece blank according to claim 8 wherein each intermediate main panel is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

10. A one-piece blank according to claim 3 wherein each of said outer main panels is cut and scored whereby one end of its second primary portion terminates in at least a pair of secondary portions each hingeably and integrally connected to said first and second primary portions of each of said outer main panels and serving, upon said uniting, as a further transverse partition constituted by said pair of secondary portions disposed in a common plane.

11. A one-piece blank according to claim 10 wherein each intermediate main panel is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

12. A one-piece blank adapted to form a unitary member constituting an interior assembly defining a plurality of rows of adjacent article receiving compartments within a carton having a wall structure including mutually opposed side and end walls and a bottom; said blank being cut and scored to provide a pair of outer main panels spaced apart by a pair of intermediate main panels all of said main panels being integrally connected together in side-by-side relationship and sequentially stepped with respect to each other; a plurality of score lines, each of which is common to a respective adjacent pair of main panels and extends longitudinally therebetween; each of said main panels being cut and scored to provide at least a first primary portion and at least a second primary portion; each of said main panels being further cut and scored to provide a plurality of secondary portions each serving to hingeably and integrally connect said first primary portion with said second primary portion; said second primary portion of each main panel and its connected secondary portions being adapted to be moved outwardly from said first portion of each main panel; each said second primary portion thereby extending parallel with its said first primary portion and the said secondary portions of each main panel thereby extending between and at right angles to its connected first and second primary portions; said second primary portion of each of said outer main panels, when said blank is folded along said common score lines and united with a blank forming the wall structure of the carton, being adapted to be secured in face-to-face contact with an adjacent side wall of the carton to serve as an outer longitudinal partition; said first primary portion of each of said outer main panels, upon said uniting, being secured to said first primary portion of an adjacent intermediate main panel and being in face-to-face contact therewith throughout its length; said first primary portion of the said outer main panels and said first primary portion of said adjacent intermediate main panels serving as a pair of spaced intermediate longitudinal partitions between said outer pair of longitudinal partitions; said second primary portion of one intermediate panel, upon said uniting, being secured to said second primary portion of the remaining intermediate panel, and being in face-to-face contact therewith throughout its length, so as to form a median longitudinal partition; said outer longitudinal partitions each preventing contact between predetermined areas of articles in the outer rows of compartments and the associated adjacent side wall of the carton, said intermediate longitudinal partitions each preventing contact between predetermined areas of articles in an intermediate row of compartments and an adjacent outer row thereof, and said median longitudinal partition preventing contact between predetermined areas of articles in adjacent intermediate rows of compartments.

13. A one-piece blank according to claim 12 wherein each of said main panels is cut and scored to provide end tabs thereon adapted, upon said uniting, to be secured to an adjacent end wall of the carton.

14. A one-piece blank according to claim 12 wherein each of said main panels is cut and scored to provide at least a pair of adjacent longitudinal series of secondary portions spaced by a part of said second primary portion and a plurality of score lines connecting each of said secondary portions with each main panel; certain of said transverse partitions of each outer main panel, upon said uniting and outward movement of said secondary portions, being constituted up upper and lower secondary portions disposed in a common plane.

15. A one-piece blank according to claim 14 wherein one of said outer main panels is cut and scored whereby one end of its said second primary portion terminates in a secondary portion hingeably and integrally connected to said first and second primary portions of said outer main panel and serving, upon said uniting, as a further transverse partition.

16. A one-piece blank according to claim 15 wherein each of said intermediate main panels is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

17. A one-piece blank according to claim 14 wherein each of said outer main panels is cut and scored whereby one end of said second primary portion of each outer main panel terminates in a secondary portion hingeably and integrally connected to said first and second primary portions of each said outer main panel and serving, upon said uniting, as a further transverse partition.

18. A one-piece blank according to claim 17 wherein each of said intermediate main panels is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

19. A one-piece blank according to claim 14 wherein one of said outer main panels is cut and scored whereby each end of each second primary portion of said outer main panel terminates in at least a pair of secondary portions each hingeably and integrally connected to said first and second primary portions of their associated outer main panel and serving, upon said uniting, as further transverse partitions.

20. A one-piece blank according to claim 19 wherein said intermediate main panel is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

21. A one-piece blank according to claim 14 wherein each of said outer main panels is cut and scored whereby each end of each second primary portion of each outer main panel terminates in at least a pair of secondary portions, each of said pairs being hingeably and integrally connected to said first and second primary portions of their associated outer main panel and serving, upon said uniting, as further transverse partitions.

22. A one-piece blank according to claim 21 wherein said intermediate main panel is cut and scored whereby one end of its said second primary portion terminates in at least a pair of secondary portions each hingeably and integrally connected to said first and second primary portions of said intermediate main panel and serving, upon said uniting, as a further transverse partition constituted by said pair of secondary portions disposed in a common plane.

23. A carton having a wall structure comprising mutually opposed side and end walls and a bottom; an interior assembly of mutually transverse partitions fixed to said wall structure and defining a plurality of rows of adjacent article receiving compartments within said carton; said interior assembly including a pair of mutually opposed outer longitudinal partitions each secured in face-to-face contact with an adjacent side wall of the carton; at least a pair of intermediate longitudinal partitions between said outer longitudinal partitions; a plurality of transverse partitions hingeably and integrally connected, at one end thereof, to each of said outer longitudinal partitions and extending inwardly into said carton from their respective outer longitudinal partitions; the transverse partitions of each of said outer longitudinal partitions being hingeably and integrally connected, at the other end thereof, to a first longitudinally extending panel; a second longitudinally extending panel integrally joined along one side edge to each said first longitudinally extending panel and being in face-to-face contact therewith along its length to form a pair thereof; said secured pairs of first and second longitudinally extending panels constituting a pair of intermediate longitudinal partitions between said outer longitudinal partitions; and a plurality of transverse partitions located between said pair of intermediate partitions and being hingeably and integrally connected, at one end thereof, to an associated said second longitudinally extending panel; said pair of outer longitudinal partitions each preventing contact between predetermined areas of articles in the outer rows of compartments and an adjacent side wall of the carton, and said intermediate longitudinal partitions preventing contact between predetermined areas of articles in an intermediate row of compartments and the outer rows thereof.

24. A carton according to claim 23 wherein certain of said transverse partitions of at least one outer row of compartments are each constituted by at least a pair of upper and lower secondary portions disposed in a common plane and wherein one other transverse partition of said one outer row of compartments is constituted by at least three secondary portions disposed in a common plane.

25. A carton according to claim 23 wherein each of the first and second longitudinally extending panels and at least one of said pair of mutually opposed outer longitudinal partitions is provided with at least one end tab adapted to be secured to an adjacent end wall of said carton.

26. A carton according to claim 23 wherein certain of said transverse partitions of at least one outer row of compartments are each constituted by at least a pair of upper and lower secondary portions disposed in a common plane and wherein one other transverse partition of said one outer row of compartments is constituted by a single secondary portion.

27. A carton according to claim 26 wherein a portion of at least one of said pair of mutually opposed outer longitudinal partitions is located between and connected to one end of each upper and lower pair of secondary portions of said one outer row of compartments; one end of said one outer longitudinal partition being connected to said single secondary portion of said one outer row of compartments.

28. A carton according to claim 27 wherein said first longitudinally extending panel associated with said one outer row of compartments is provided with at least an upper longitudinally extending portion connecting the other ends of said upper secondary portions of said one outer row of compartments with one another; at least a lower longitudinally extending portion connecting the other ends of said lower secondary portions of said one outer row of compartments with one another; and at least one ancillary portion connecting said upper and lower longitudinally extending portions together as well as connecting the other end of said single secondary portion of said one outer row of compartments with said first longitudinally extending panel.

29. A carton according to claim 27 wherein the transverse partitions of the remaining rows of compartments are each constituted by at least a pair of upper and lower transversely extending panels disposed in a common plane, and wherein the remaining outer longitudinal partition is provided with at least one upper longitudinally extending portion connecting one end of certain of the upper secondary portions of the ramining outer row of compartments with one another; at least one lower longitudinally extending portion connecting one end of certain of the lower secondary portions of said remaining outer row of compartments with one another; and at least one ancillary portion connecting said upper and lower longitudinally extending portions of said remaining outer longitudinal partition with one another as well as connecting together one end of each of a selected pair of upper and lower secondary portions, disposed in a common plane, of said remaining outer row of compartments.

30. A carton according to claim 29 wherein the first longitudinally extending panel associated with said remaining outer row of compartments is provided with at least an upper longitudinally extending portion connecting the other ends of certain of said upper and lower pairs of secondary portions of said remaining outer row of compartments with one another and attached, at one end thereof, to the other end of a selected upper one of said secondary portions of said remaining outer row of compartments; at least a lower longitudinally extending portion; and at least one ancillary portion connecting said upper and lower longitudinally extending portions of said first longitudinally extending panel together, and also connecting together one end of each of a selected pair of upper and lower secondary portions, disposed in a common plane, of said remaining outer row of compartments; said lower longitudinally extending portion also connecting the other end of at least one lower secondary portion of said remaining outer row of compartments with said ancillary portion.

31. A carton according to claim 23 wherein the transverse partitions of the remaining rows of compartments are each constituted by at least a pair of upper and lower secondary portions disposed in a common plane.

32. A carton according to claim 31 wherein the second longitudinally extending panel secured to said first longitudinally extending panel associated with said one outer row of compartments is provided with at least an upper longitudinally extending portion connecting one end of certain of said upper secondary portions of said intermediate row of compartments with one another; at least a lower longitudinally extending portion connecting one end of certain of said lower secondary portions of said intermediate row of compartments with one another; and at least one ancillary portion connecting said upper and lower longitudinally extending portions of said second longitudinally extending panel together as well as connecting together one end of a selected pair of upper and lower secondary portions, disposed in a common plane, of said intermediate row of compartments.

33. A carton according to claim 32 wherein the second longitudinally extending panel secured to said first longitudinally extending panel associated with said remaining outer row of compartments is provided with at least an upper longitudinally extending portion connecting the other ends of certain of said upper and lower pairs of secondary portions of said intermediate row of compartments with one another and being attached to the other end of a selected upper one of said secondary portions of said intermediate row of compartments; at least a lower longitudinally extending portion; and at least one ancillary portion connecting together said upper and lower longitudinally extending portions of said second longitudinally extending panel and also connecting together one end of each of a selected pair of upper and lower secondary portions, disposed in a common plane, of said intermediate row of compartments; said lower longitudinally extending portion connecting the other end of at least one lower secondary portion of said intermediate row of compartments with said ancillary portion.

34. A carton having a wall structure comprising mutually opposed side and end walls and a bottom; an interior assembly, of mutually transverse partitions, fixed to said wall structure and defining a plurality of rows of adjacent article receiving compartments within said carton; said interior assembly including a pair of mutually opposed outer longitudinal partitions each secured in face-to-face contact with an adjacent side wall of the carton; a plurality of transverse partitions hingeably and integrally connected, at one end thereof, to each of said outer longitudinal partitions and extending inwardly into said carton from their respective outer longitudinal partitions; the transverse partitions of each of said outer longitudinal partitions being hingeably and integrally connected, at the other end thereof, to a first longitudinally extending panel; a second longitudinally extending panel integrally joined along one side edge to each said first longitudinally extending panel and in face-to-face contact therewith throughout its length to form a pair thereof; said secured pairs of first and second longitudinally extending panels constituting a pair of intermediate longitudinal partitions between said outer longitudinal partitions; an additional pair of longitudinally extending panels integrally joined along one side edge and in face-to-face contact throughout their length and located between said pair of intermediate longitudinal partitions, said additional pair of panels constituting a median longitudinal partition; and a plurality of transverse partitions hingeably and integrally connected, at each end thereof, with each of said second longitudinally extending panels and an adjacent one of said additional pair of longitudinally extending panels; said pair of outer longitudinal partitions each preventing contact between predetermined areas of articles in the outer rows of compartments and an adjacent side wall of the carton, said intermediate longitudinal partitions preventing contact between predetermined areas of articles in an intermediate row of compartments and the outer rows thereof, and said median longitudinal partition preventing contact between predetermined areas of articles in adjacent intermediate rows of compartments.

35. A carton according to claim 34 wherein the transverse partitions of the adjacent intermediate rows of compartments are each constituted by at least a pair of upper and lower secondary portions disposed in a common plane.

36. A carton according to claim 34 wherein each of the first and second longitudinally extending panels and each of said additional pair of panels is provided with at least one end tab adapted to be secured to an adjacent end wall of the carton.

37. A carton according to claim 34 wherein certain of said transverse partitions of each of said outer rows of compartments are each constituted by at least a pair of upper and lower secondary portions disposed in a common plane and wherein one other transverse partition of each of said outer rows is constituted by a single secondary portion.

38. A carton according to claim 37 wherein each of said pair of mutually opposed outer longitudinal partitions is located between and connected to one end of each upper and lower pair of secondary portions of each of said outer rows of compartments; one end of each of said outer longitudinal partitions being connected to one end of said single secondary portion of its associated outer row of compartments.

39. A carton according to claim 38 wherein each of said first longitudinally extending panels associated with each outer row of compartments is provided with at least an upper longitudinally extending portion connecting together the other ends of said upper secondary portions of its associated outer row of compartments; at least a lower longitudinally extending portion connecting together the other ends of said lower secondary portions of its associated outer row of compartments, and at least one ancillary portion connecting said upper and lower longitudinally extending portions together as well as connecting the other end of the single secondary portion of its associated outer row of compartments with the related first longitudinally extending partition.

40. A carton according to claim 34 wherein certain of said transverse partitions of each of said outer rows of compartments are each constituted by at least a pair of upper and lower secondary portions disposed in a common plane and wherein one other transverse partition of each of said outer rows is constituted by at least three secondary portions disposed in a common plane.

41. A carton according to claim 40 wherein each of said pair of mutually opposed outer longitudinal partitions is provided with at least an upper longitudinally extending portion connecting one end of certain of said upper secondary portions of each of said outer rows of compartments together; at least a lower longitudinally extending portion connecting one end of certain of said lower secondary portions of each of said outer rows of compartments together; and at least one ancillary portion connecting said upper and lower longitudinally extending portions together as well as connecting together one end of said three secondary portions, disposed in a common plane, of its associated outer row of compartments.

42. A carton according to claim 41 wherein each of said first longitudinally extending panels associated with each outer row of compartments is provided with at least an upper longitudinally extending portion connected to the other end of the uppermost of said three secondary portions, disposed in a common plane, of its associated outer row of compartments; at least a lower longitudinally extending portion connecting together the other ends of the remaining two of said three secondary portions and the other ends of certain of the remainder of said upper and lower secondary portions; and at least one ancillary portion connecting together said upper and lower longitudinally extending portions and also connecting together the other ends of a selected pair of upper and lower secondary portions, disposed in a common plane, of its said associated outer row of compartments.

References Cited in the file of this patent

UNITED STATES PATENTS

| | | |
|---|---|---|
| 2,411,144 | Bergstein | Nov. 19, 1946 |
| 2,943,762 | Richardson | July 5, 1960 |
| 2,943,763 | Richardson | July 5, 1960 |

FOREIGN PATENTS

| | | |
|---|---|---|
| 79,486 | Norway | Dec. 3, 1951 |